US008052522B2

(12) United States Patent
Crivelli

(10) Patent No.: US 8,052,522 B2
(45) Date of Patent: Nov. 8, 2011

(54) PRINTER INTERPRETER FOR A GAMING MACHINE

(75) Inventor: Franco E. Crivelli, Reno, NV (US)

(73) Assignee: IGT, Reno, NV (US)

( * ) Notice: Subject to any disclaimer, the term of this patent is extended or adjusted under 35 U.S.C. 154(b) by 129 days.

(21) Appl. No.: 12/353,047

(22) Filed: Jan. 13, 2009

(65) Prior Publication Data

US 2009/0163270 A1 Jun. 25, 2009

Related U.S. Application Data

(63) Continuation of application No. 11/077,241, filed on Mar. 9, 2005.

(51) Int. Cl.
*A63F 13/02* (2006.01)
*A63F 9/24* (2006.01)

(52) U.S. Cl. ................. 463/25; 463/42; 463/43; 463/47

(58) Field of Classification Search .................... 463/16, 463/19–20, 42, 46, 43, 47
See application file for complete search history.

(56) References Cited

U.S. PATENT DOCUMENTS

| | | | |
|---|---|---|---|
| 5,038,022 | A | 8/1991 | Lucero |
| 5,083,271 | A | 1/1992 | Thatcher et al. |
| 5,119,295 | A | 6/1992 | Kapur |
| 5,129,652 | A | 7/1992 | Wilkinson |
| 5,244,207 | A | 9/1993 | Laatikainen |
| 5,265,874 | A | 11/1993 | Dickinson et al. |
| 5,326,104 | A | 7/1994 | Pease et al. |
| 5,382,784 | A | 1/1995 | Eberhardt |
| 5,429,361 | A | 7/1995 | Raven et al. |
| 5,457,305 | A | 10/1995 | Akel et al. |
| 5,471,669 | A | 11/1995 | Lidman |
| 5,505,461 | A | 4/1996 | Bell et al. |
| 5,528,248 | A | 6/1996 | Steiner et al. |
| 5,544,086 | A | 8/1996 | Davis et al. |
| 5,557,086 | A | 9/1996 | Schulze et al. |

(Continued)

FOREIGN PATENT DOCUMENTS

AU 200028891 A1 11/2000

(Continued)

OTHER PUBLICATIONS

USPTO Office Action dated Jul. 27, 2007 in U.S. Appl. No. 11/077,241.

(Continued)

*Primary Examiner* — Peter DungBa Vo
*Assistant Examiner* — Damon Pierce
(74) *Attorney, Agent, or Firm* — Weaver Austin Villeneuve & Sampson LLP

(57) ABSTRACT

Methods and systems for issuing cashless instruments and providing a printer interpreter for a gaming machine are disclosed. A printer and specialized printer interpreter (controller) are provided to facilitate the conversion of a specific credit amount to a currency amount in differing units (first form of currency), and the subsequent issuance of a cashless instrument reflecting that currency amount. Where the printer interpreter is reconfigurable, a second currency amount in different units (second form of currency) could also be selected. Multiple different currencies and their corresponding languages can be available to the printer interpreter, such that a given credit amount can be issued to a cashless instrument in one of many different currencies. Game execution operations of the MGC are isolated from the printer interpreter, such that recertification of the gaming machine or system is not necessary when reconfiguring the printer interpreter from one form of currency to another.

17 Claims, 8 Drawing Sheets

U.S. PATENT DOCUMENTS

| | | | |
|---|---|---|---|
| 5,559,312 | A | 9/1996 | Lucero |
| 5,586,936 | A | 12/1996 | Bennett et al. |
| 5,618,045 | A | 4/1997 | Kagan et al. |
| 5,643,086 | A | 7/1997 | Alcorn et al. |
| 5,651,548 | A | 7/1997 | French et al. |
| 5,678,886 | A | 10/1997 | Infanti |
| 5,735,742 | A | 4/1998 | French |
| 5,738,583 | A | 4/1998 | Comas et al. |
| 5,741,183 | A | 4/1998 | Acres et al. |
| 5,759,102 | A | 6/1998 | Pease et al. |
| 5,761,647 | A | 6/1998 | Boushy |
| 5,762,552 | A | 6/1998 | Vuong et al. |
| 5,768,382 | A | 6/1998 | Schneier et al. |
| 5,770,533 | A | 6/1998 | Franchi |
| 5,779,545 | A | 7/1998 | Berg et al. |
| 5,779,546 | A | 7/1998 | Meissner et al. |
| 5,779,549 | A | 7/1998 | Walker et al. |
| 5,790,677 | A | 8/1998 | Fox et al. |
| 5,795,228 | A | 8/1998 | Trumbull et al. |
| 5,797,085 | A | 8/1998 | Beuk et al. |
| 5,816,917 | A | 10/1998 | Kelmer et al. |
| 5,871,398 | A | 2/1999 | Schneier et al. |
| 5,915,023 | A | 6/1999 | Bernstein |
| 5,937,066 | A | 8/1999 | Gennaro et al. |
| 5,970,143 | A | 10/1999 | Schneier et al. |
| 5,971,855 | A | 10/1999 | Ng |
| 5,999,808 | A | 12/1999 | LaDue |
| 6,001,016 | A | 12/1999 | Walker et al. |
| 6,003,013 | A | 12/1999 | Boushy et al. |
| 6,012,832 | A | 1/2000 | Saunders et al. |
| 6,012,983 | A | 1/2000 | Walker et al. |
| 6,019,283 | A | 2/2000 | Lucero |
| 6,048,269 | A | 4/2000 | Burns et al. |
| 6,093,100 | A | 7/2000 | Singer et al. |
| 6,099,408 | A | 8/2000 | Schneier et al. |
| 6,104,815 | A | 8/2000 | Alcorn et al. |
| 6,106,396 | A | 8/2000 | Alcorn et al. |
| 6,110,041 | A | 8/2000 | Walker et al. |
| 6,117,013 | A | 9/2000 | Eiba |
| 6,142,876 | A | 11/2000 | Cumbers |
| 6,149,522 | A | 11/2000 | Alcorn et al. |
| 6,154,543 | A | 11/2000 | Baltzley |
| 6,165,072 | A | 12/2000 | Davis et al. |
| 6,178,510 | B1 | 1/2001 | O'Connor et al. |
| 6,210,279 | B1 | 4/2001 | Dickinson |
| 6,253,119 | B1 | 6/2001 | Dabrowski |
| 6,270,410 | B1 | 8/2001 | DeMar et al. |
| 6,280,326 | B1 | 8/2001 | Saunders |
| 6,285,868 | B1 | 9/2001 | LaDue |
| 6,287,200 | B1 | 9/2001 | Sharma |
| 6,302,793 | B1 | 10/2001 | Fertitta et al. |
| 6,312,333 | B1 | 11/2001 | Acres |
| 6,331,144 | B1 | 12/2001 | Walker et al. |
| 6,340,331 | B1 | 1/2002 | Saunders et al. |
| 6,343,988 | B1 | 2/2002 | Walker et al. |
| 6,347,996 | B1 | 2/2002 | Gilmore et al. |
| 6,368,219 | B1 | 4/2002 | Szrek et al. |
| 6,379,248 | B1 | 4/2002 | Jorasch et al. |
| 6,383,077 | B1 | 5/2002 | Kweitko et al. |
| 6,394,907 | B1 | 5/2002 | Rowe |
| 6,488,585 | B1 | 12/2002 | Wells et al. |
| 6,500,067 | B1 | 12/2002 | Luciano et al. |
| 6,508,709 | B1 | 1/2003 | Karmarkar |
| 6,511,377 | B1 | 1/2003 | Weiss |
| 6,514,140 | B1 | 2/2003 | Storch |
| 6,533,662 | B2 | 3/2003 | Soltys et al. |
| 6,554,707 | B1 | 4/2003 | Sinclair et al. |
| 6,560,581 | B1 | 5/2003 | Fox et al. |
| 6,612,928 | B1 | 9/2003 | Bradford et al. |
| 6,676,522 | B2 | 1/2004 | Rowe et al. |
| 6,678,664 | B1 | 1/2004 | Ganesan |
| 6,679,775 | B1 | 1/2004 | Luciano et al. |
| 6,681,984 | B2 | 1/2004 | Brunner |
| 6,682,421 | B1 | 1/2004 | Rowe et al. |
| 6,687,700 | B1 | 2/2004 | Cornelius et al. |
| 6,702,672 | B1 | 3/2004 | Angell et al. |
| 6,712,698 | B2 | 3/2004 | Paulsen et al. |
| 6,716,103 | B1 | 4/2004 | Eck et al. |
| 6,722,985 | B2 | 4/2004 | Criss-Puszkiewicz et al. |
| 6,729,957 | B2 | 5/2004 | Burns et al. |
| 6,732,195 | B1 | 5/2004 | Baldwin |
| 6,739,972 | B2 | 5/2004 | Flanagan-Parks et al. |
| 6,758,393 | B1 | 7/2004 | Luciano et al. |
| 6,761,637 | B2 | 7/2004 | Weston et al. |
| 6,800,029 | B2 | 10/2004 | Rowe et al. |
| 6,805,634 | B1 | 10/2004 | Wells et al. |
| 6,846,238 | B2 | 1/2005 | Wells |
| 6,848,995 | B1 | 2/2005 | Walker et al. |
| 6,852,031 | B1 | 2/2005 | Rowe |
| 6,866,586 | B2 | 3/2005 | Oberberger et al. |
| 6,905,411 | B2 | 6/2005 | Nguyen et al. |
| 6,935,958 | B2 | 8/2005 | Nelson |
| 6,971,956 | B2 | 12/2005 | Rowe et al. |
| 6,984,175 | B2 | 1/2006 | Nguyen et al. |
| 6,987,948 | B2 | 1/2006 | Engstrom et al. |
| 7,040,987 | B2 | 5/2006 | Walker et al. |
| 7,131,909 | B2 | 11/2006 | Rowe |
| 7,350,696 | B2 | 4/2008 | Frerking |
| 7,419,428 | B2 | 9/2008 | Rowe |
| 7,927,211 | B2 | 4/2011 | Rowe et al. |
| 2001/0032878 | A1 | 10/2001 | Tsiounis et al. |
| 2001/0044337 | A1 | 11/2001 | Rowe et al. |
| 2002/0032656 | A1 | 3/2002 | Chen |
| 2002/0045477 | A1 | 4/2002 | Dabrowski |
| 2002/0071557 | A1 | 6/2002 | Nguyen |
| 2002/0077178 | A1 | 6/2002 | Oberberger et al. |
| 2002/0082076 | A1 | 6/2002 | Roser et al. |
| 2002/0098888 | A1 | 7/2002 | Rowe et al. |
| 2002/0103027 | A1 | 8/2002 | Rowe et al. |
| 2002/0128059 | A1 | 9/2002 | Baltz et al. |
| 2002/0132663 | A1 | 9/2002 | Cumbers |
| 2002/0142825 | A1 | 10/2002 | Lark et al. |
| 2002/0142846 | A1 | 10/2002 | Paulsen |
| 2002/0151366 | A1 | 10/2002 | Walker et al. |
| 2002/0152120 | A1 | 10/2002 | Howington |
| 2003/0036425 | A1 | 2/2003 | Kaminkow et al. |
| 2003/0045354 | A1 | 3/2003 | Giobbi |
| 2003/0050831 | A1 | 3/2003 | Klayh |
| 2003/0054881 | A1 | 3/2003 | Hedrick et al. |
| 2003/0064769 | A1 | 4/2003 | Muir |
| 2003/0083126 | A1 | 5/2003 | Paulsen et al. |
| 2003/0148812 | A1 | 8/2003 | Paulsen et al. |
| 2003/0171145 | A1 | 9/2003 | Rowe |
| 2003/0216967 | A1 | 11/2003 | Williams |
| 2003/0228907 | A1 | 12/2003 | Gatto et al. |
| 2004/0002386 | A1 | 1/2004 | Wolfe et al. |
| 2004/0048667 | A1 | 3/2004 | Rowe |
| 2004/0132529 | A1 | 7/2004 | Mkrtchyan et al. |
| 2004/0209690 | A1 | 10/2004 | Bruzzese et al. |
| 2004/0266533 | A1 | 12/2004 | Gentles et al. |
| 2005/0009600 | A1 | 1/2005 | Rowe et al. |
| 2005/0054438 | A1 | 3/2005 | Rothschild et al. |
| 2005/0124411 | A1 | 6/2005 | Schneider |
| 2005/0266919 | A1 | 12/2005 | Rowe et al. |
| 2006/0016883 | A1 | 1/2006 | Silva et al. |
| 2006/0068904 | A1 | 3/2006 | Nguyen et al. |
| 2006/0205482 | A1 | 9/2006 | Crivelli |
| 2007/0004510 | A1 | 1/2007 | Underdahl et al. |
| 2007/0060274 | A1 | 3/2007 | Rowe et al. |
| 2007/0060311 | A1 | 3/2007 | Rowe et al. |
| 2007/0060394 | A1 | 3/2007 | Gowin et al. |
| 2007/0087834 | A1 | 4/2007 | Moser et al. |
| 2007/0099696 | A1 | 5/2007 | Nguyen et al. |
| 2007/0117623 | A1 | 5/2007 | Nelson et al. |
| 2008/0188308 | A1 | 8/2008 | Shepherd et al. |

FOREIGN PATENT DOCUMENTS

| | | | |
|---|---|---|---|
| DE | 44 22 370 | | 4/1986 |
| DE | 34 41 518 | | 5/1986 |
| DE | 42 05 098 | | 8/1993 |
| DE | 195 02 613 | | 8/1996 |
| EP | 0 015 081 | | 9/1980 |
| EP | 0744786 | | 11/1996 |
| EP | 0 805 424 | | 5/1997 |
| EP | 0933717 | A2 | 8/1999 |
| EP | 1 004 970 | | 5/2000 |
| GB | 2 151 061 | | 7/1985 |

| | | |
|---|---|---|
| RU | 2 072 560 | 1/1997 |
| RU | 2 145 116 | 1/2000 |
| WO | WO85/00910 | 2/1985 |
| WO | WO 95/24689 | 9/1995 |
| WO | WO 96/00950 | 1/1996 |
| WO | WO 96/12262 | 4/1996 |
| WO | WO 97/44750 | 11/1997 |
| WO | WO 98/30297 | 7/1998 |
| WO | WO 99/01188 | 1/1999 |
| WO | WO 99/10061 | 3/1999 |
| WO | WO 99/22350 | 5/1999 |
| WO | WO 99/23594 | 5/1999 |
| WO | WO 99/45652 | 9/1999 |
| WO | WO 00/38088 | 6/2000 |
| WO | WO 00/49547 | 8/2000 |
| WO | WO 01/25992 | 4/2001 |
| WO | WO 01/54091 | 7/2001 |
| WO | WO 01/76710 | 10/2001 |
| WO | WO 01/84516 | 11/2001 |
| WO | WO 01/91075 | 11/2001 |
| WO | WO 01/91866 | 12/2001 |
| WO | WO 02/21370 | 3/2002 |
| WO | WO 02/32520 | 4/2002 |
| WO | WO 02/058020 | 7/2002 |
| WO | WO 03/044746 | 5/2003 |
| WO | WO 03/084625 | 10/2003 |
| WO | WO 2004/024268 | 3/2004 |
| WO | WO 2004/064354 | 7/2004 |
| WO | WO 2004/090818 | 10/2004 |
| WO | WO 2006/010011 | 1/2006 |
| WO | WO 2006/138082 | 12/2006 |
| WO | WO 2009/126736 | 10/2009 |

OTHER PUBLICATIONS

USPTO Final Office Action dated Mar. 19, 2008 in U.S. Appl. No. 11/077,241.
USPTO Office Action dated Oct. 1, 2008 in U.S. Appl. No. 11/077,241.
U.S. Office Action dated Nov. 29, 2001 issued in U.S. Appl. No. 09/544,884.
U.S. Office Action Final dated Jun. 5, 2002 issued in U.S. Appl. No. 09/544,884.
U.S. Office Action dated Nov. 12, 2002 issued in U.S. Appl. No. 09/544,884.
U.S. Office Action (Examiner Interview Summary) dated Feb. 4, 2003 issued in U.S. Appl. No. 09/544,884.
U.S. Office Action Final dated May 7, 2003 issued in U.S. Appl. No. 09/544,884.
U.S. Office Action (Examiner Interview Summary) dated Aug. 8, 2003 issued in U.S. Appl. No. 09/544,884.
U.S. Notice of Allowance and Allowability dated Sep. 10, 2003 issued in U.S. Appl. No. 09/544,884.
U.S. Office Action dated Jun. 1, 2004 issued in U.S. Appl. No. 10/044,218.
U.S. Office Action Final dated Jan. 25, 2005 issued in U.S. Appl. No. 10/044,218.
U.S. Office Action (Examiner Interview Summary) dated Apr. 8, 2005 issued in U.S. Appl. No. 10/044,218.
U.S. Notice of Allowance dated Jun. 15, 2005 issued in U.S. Appl. No. 10/044,218.
U.S. Supplemental Notice of Allowance dated Sep. 30, 2005 issued in U.S. Appl. No. 10/044,218.
U.S. Office Action dated Jul. 2, 2003 issued in U.S. Appl. No. 10/115,164.
U.S. Office Action Final dated Dec. 16, 2003 issued in U.S. Appl. No. 10/115,164.
U.S. Office Action (Advisory Action) dated Mar. 3, 2004 issued in U.S. Appl. No. 10/115,164.
U.S. Notice of Allowance dated Apr. 9, 2004 issued in U.S. Appl. No. 10/115,164.
U.S. Office Action dated Jun. 24, 2008 issued in U.S. Appl. No. 10/886,944.
U.S. Office Action dated Mar. 10, 2009 issued in U.S. Appl. No. 10/886,944.
U.S.Final Office Action dated Jul. 31, 2009 issued in U.S. Appl. No. 10/886,944.
U.S.Office Action dated Apr. 2, 2010 issued in U.S. Appl. No. 10/886,944.
U.S. Notice of Allowance and Allowability dated Jan. 17, 2001 issued in U.S. Appl. No. 09/648,382.
U.S. Notice of Allowability dated Apr. 13, 2001 issued in U.S. Appl. No. 09/648,382.
U.S. Notice of Allowance and Allowability dated Aug. 20, 2001 issued in U.S. Appl. No. 09/648,382.
U.S. Office Action dated Apr. 12, 2002 issued in U.S. Appl. No. 09/648,382.
U.S. Office Action dated Jan. 21, 2004 issued in U.S. Appl. No. 09/993,163.
U.S. Office Action (Examiner Interview Summary) dated Mar. 14, 2004 issued in U.S. Appl. No. 09/993,163.
U.S. Office Action Final dated Jun. 23, 2004 issued in U.S. Appl. No. 09/993,163.
U.S. Notice of Allowance dated Oct. 27, 2004 issued in U.S. Appl. No. 09/993,163.
U.S. Office Action dated Apr. 18, 2006 issued in U.S. Appl. No. 10/406,911.
U.S. Office Action (Examiner Interview Summary) dated Jul. 10, 2006 issued in U.S. Appl. No. 10/406,911.
U.S. Office Action Final dated Jan. 22, 2007 issued in U.S. Appl. No. 10/406,911.
U.S. Office Action dated Sep. 12, 2007 issued in U.S. Appl. No. 10/406,911.
U.S. Notice of Allowance and Allowed Claims dated Jun. 9, 2008 issued in U.S. Appl. No. 10/406,911.
U.S. Office Action dated Feb. 21, 2008 issued in U.S. Appl. No. 11/154,833.
U.S. Office Action dated Sep. 15, 2008 issued in U.S. Appl. No. 11/154,833.
U.S. Office Action Final dated May 27, 2009 issued in U.S. Appl. No. 11/154,833.
U.S. Office Action (Advisory Action) dated Jul. 8, 2008 issued in U.S. Appl. No. 11/077,241.
U.S. Notice of Allowance dated Mar. 10, 2009 issued in U.S. Appl. No. 11/077,241.
U.S. Office Action dated Jul. 21, 2009 issued in U.S. Appl. No. 11/077,241.
U.S. Final Office Action dated Jan. 4, 2010 issued in U.S. Appl. No. 11/077,241.
Australian Office Action dated May 25, 2005 issued in AU2001249901.
Australian Notice of Acceptance dated Feb. 26, 2007 issued in AU2001249901.
Australian Examiner's First Report dated Jul. 3, 2008 issued in AU2003225966.
Australian Office Action mailed Feb. 26, 2010 in Application No. 2005265273.
Canadian Office Action dated Mar. 20, 2009 issued in 2,405,166.
Canadian Office Action dated Apr. 14, 2010 issued in 2,407,552.
Canadian Office Action dated Feb. 24, 2010 issued in 2,467,075.
European Examination Report dated Dec. 15, 2004 issued in EP01923183.6.
European Office Action (Rule 51(4) EPC) dated Oct. 24, 2005 issued in EP01923183.6.
European Search Report dated Jun. 12, 2006 issued in EP 06003771. 0.
PCT International Search Report dated Mar. 18, 2002 issued in PCT/US2001/11134 (WO 2001/76710).
PCT Written Opinion dated May 3, 2002 issued in PCT/US2001/11134 (WO 2001/76710).
PCT International Preliminary Examination Report dated Jul. 2, 2002 issued in PCT/US2001/11134 (WO 2001/76710).
GB Examination Report dated Apr. 7, 2005 issued in GB0422040.6.
GB Examination Report dated Apr. 28, 2006 issued in GB0422040.6.
GB Combined Search and Examination Report dated Apr. 28, 2006 issued in GB0605518.0.
PCT International Search Report dated Jul. 23, 2003 issued in PCT/US2003/09027 (WO 2003/084625).

PCT International Preliminary Examination Report dated Jan. 27, 2004 issued in PCT/U52003/09027 (WO 2003/084625).
PCT International Search Report dated Mar. 13, 2006 issued in PCT/US2005/024298 (WO2006/010011).
PCT International Preliminary Report on Patentability and Written Opinion dated Apr. 19, 2006 issued in PCT/US2005/024298 (WO2006/010011).
PCT Invitation to Pay Fees, Partial Search Report Annex dated Nov. 7, 2005 issued in PCT/US2005/024298 (WO/US2006/010011).
PCT International Search Report and Written Opinion dated Jul. 3, 2009 issued in PCT/US2009/039953.
Australian Examiner's First Report dated Sep. 12, 2005 issued in AU2001255746.
Australian Examiner's First Report dated Oct. 17, 2007 issued in 2006203189.
Australian Notice of Acceptance dated Dec. 5, 2008 issued in 2006203189.
Australian Notice of Opposition dated Mar. 16, 2009 issued in 2006203189.
Canadian Office Action dated Jan. 28, 2009 issued in 2,407,552.
European Examination Report dated Nov. 17, 2006 issued in EP01928944.6.
PCT International Search Report dated Nov. 22, 2001 issued in PCT/US2001/013629 (WO2001/84516).
PCT International Preliminary Examination Report dated Nov. 22, 2002 issued in PCT/US2001/013629 (WO2001/84516).
PCT Written Opinion dated Sep. 26, 2002 issued in PCT/US2001/13629 (WO2001/84516).
Australian Examination Report dated Nov. 23, 2007 issued in AU2002366161.
Australian Notice of Acceptance dated Dec. 30, 2008 issued in AU2002366161.
European Examination Report dated Feb. 9, 2009 issued in EP02803653.1.
PCT International Search Report dated Aug. 8, 2003 issued in PCT/US2002/36939 (WO 2003/044746).
Australian Examination Report dated May 12, 2009 issued in AU2004227884.
European Examination Report dated Jan. 11, 2006 issued in EP04749734.2.
European Summons to Attend Oral Proceedings dated Sep. 29, 2006 issued in EP04 749734.2.
PCT International Search Report dated Dec. 1, 2004 issued in PCT/US2004/010359 (WO 2004/090818).
PCT Preliminary Examination Report and Written Opinion dated Nov. 29, 2004 issued in PCT/US2004/010359 (WO 2004/090818).
PCT International Search Report dated Feb. 14, 2008 issued in PCT/US2006/21422 (WO2006/138082).
PCT International Preliminary Examination Report and Written Opinion dated Feb. 14, 2008 issued in PCT/US2006/21422 (WO2006/138082).
Bronstein et al., (Aug. 2005) "Three-Dimensional Face Recognition", *International Journal of Computer Vision*, 64:1, 44 pages.
Engelschall, Ralf (2000) "Portable Multithreading," USENIX Annual Technical Conference, [Retrieved from the Internet at <http://portal.acm.org/citation.cfm?id=356989.357012> downloaded on Jul. 24, 2006], 17 pages.
"Introduction to Public-Key Cryptography" (Oct. 9, 1998) [Retrieved from the Internet at http://developer.netscape.com/docs/manuals/security/-pkin/contents.htm, downloaded from the Internet on Jan. 8, 2004], pp. 1-20.
Lin, Chih-Han (1998) "A Soft RealTime Scheduling Server on the Windows NT" USENIX Retrieved from the Internet at <http://www.usenix.orig/publications/library/proceedings/usenix-nt98/full_papers/lin/lin.pdf>, downloaded on Jul. 24, 2006.
Schneier B. (1996) "Applied Cryptography, Second Edition," *Applied Cryptography, Protocols, Algorithms, and Source Code in C*, pp. 31-38, 50-51, XP002248999, ISBN: 0-471-11709-9.
Wang, Z. et al., "Casino Technology: Player Tracking and Slot Accounting Systems," Jan. 1, 2000. *Gaming Research and Review Journal*, UNLV International Gaming Institute, Las Vegas, NV, United States. pp. 43-56.
Yuan et al., (2001) "Virtual Private Networks-Technologies and Solutions", Addison Wesley, ISBN#0-201-70209-6, 8 pages.
U.S. Office Action dated Dec. 20, 2006 issued in U.S. Appl. No. 10/817,156.
U.S. Office Action dated Jun. 12, 2007 issued in U.S. Appl. No. 10/817,156.
U.S. Office Action dated Sep. 23, 2008 issued in U.S. Appl. No. 10/817,156.
U.S. Office Action dated Jun. 7, 2004 issued in U.S. Appl. No. 10/085,779.
U.S. Notice of Allowance and Fees Due dated Apr. 5, 2005 issued in U.S. Appl. No. 10/085,779.
U.S. Notice of Allowance and Fees Due dated Sep. 27, 2005 issued in U.S. Appl. No. 10/085,779.
European Search Report dated Jul. 12, 2005 issued in 04252032.0.
GB Examination Report dated Nov. 13, 2007 issued in GB0620783.1.
GB Examination Report dated Mar. 28, 2007 issued in GB0620783.1.
PCT International Search Report and Written Opinion dated Jul. 25, 2005 issued in PCT/US2005/011217 (WO2005/098766).
Richard E. Rowe, "Method and Apparatus for Voucher Sorting and Reconciliation in Sort Count Process," U.S. Appl. No. 09/631,855, filed Aug. 3, 2000.
Smulik et al., "The Tax Man Cometh", CasinoGaming.com Parts I and II, [http://www.casinogaming.com/features/taxlaws.html, downloaded on Dec. 8, 2008], 8 pages.
LeMay et al. "Gaming Machine Virtual Player Tracking and Related Services", filed Aug. 18, 2000, U.S. Appl. No. 09/642,192.
U.S. Notice of Allowance dated Oct. 1, 2010 issued in U.S. Appl. No. 10/886,944.
U.S. Notice of Allowance dated Feb. 22, 2011 issued in U.S. Appl. No. 10/886,944.
U.S. Office Action dated Aug. 3, 2011 issued in U.S. Appl. No. 12/100,387.
U.S. Office Action (Examiner Interview Summary) dated Jul. 23, 2004 issued in U.S. Appl. No. 09/993,163.
U.S. Advisory Action dated Oct. 9, 2009 issued in U.S. Appl. No. 11/154,833.
U.S. Office Action dated Nov. 9, 2009 issued in U.S. Appl. No. 11/154,833.
U.S. Office Action Final dated May 12, 2010 issued in U.S. Appl. No. 11/154,833.
U.S. Office Action dated Jan. 13, 2011 issued in U.S. Appl. No. 11/154,833.
U.S. Office Action Final dated Jul. 1, 2011 issued in U.S. Appl. No. 11/154,833.
U.S. Office Action dated Aug. 11, 2010 issued in U.S. Appl. No. 11/077,241.
U.S. Office Action Final dated Dec. 17, 2010 issued in U.S. Appl. No. 11/077,241.
US Examiner Interview Summary dated Feb. 11, 2011 issued in U.S. Appl. No. 11/077,241.
Canadian Office Action dated Feb. 3, 2011 issued in 2,405,166.
Australian Examiner's report No. 2 dated Mar. 16, 2011 in Application No. 2005265273.
Australian Statement of Grounds and Particulars dated Jun. 15, 2009 from Australian Patent Application No. 2006203189.
European Summons to Attend Oral Proceedings dated Dec. 16, 2008 issued in EP 01 928 944.6.
European Decision to Refuse a European Patent Application dated May 13, 2009 issued in EP 01 928 944.6-2221.
Australian Notice of Opposition dated Apr. 9, 2009 issued in AU2002366161.
Australian Statement of Grounds and Particulars dated Jul. 8, 2009 issued in AU2002366161.
Australian Examiner's Report No. 2 dated Aug. 19, 2010 issued in AU2004227884.
Australian Examiner's First Report dated Aug. 5, 2010 issued in AU2006200988.
Australian Examiner's report No. 2 dated May 3, 2011 issued in AU2006200988.

PRINTER INTERPRETER FOR A GAMING MACHINE

CROSS REFERENCE TO RELATED APPLICATION

The present application is a continuation of and claims the benefit of and priority to U.S. patent application Ser. No. 11/077,241 for PRINTER INTERPRETER FOR A GAMING MACHINE under 35 USC 120 filed on Mar. 9, 2005, the entire disclosure of which is incorporated herein by reference.

TECHNICAL FIELD

The present invention relates generally to gaming machines and systems, and more specifically to methods and apparatuses for providing and administering cashless instruments associated with gaming machines and systems.

BACKGROUND

Casinos and other forms of gaming comprise a growing multi-billion dollar industry both domestically and abroad, with electronic and microprocessor based gaming machines being more popular than ever. In a typical electronic gaming machine, such as a slot machine, video poker machine, video keno machine or the like, a game play is initiated through a player wager of money or credit, whereupon the gaming machine determines a game outcome, presents the game outcome to the player and then potentially dispenses an award of some type, including a monetary award, depending upon the game outcome. Many additional gaming machine components, features and programs have been made possible in recent years through this proliferation of electronic gaming machines, including those involving linked progressive jackpots, player tracking and loyalty points programs, and various forms of cashless gaming, among other items. Many of these added components, features and programs can involve the implementation of various back-end and/or networked systems, including more hardware and software elements, as is generally known.

Electronic and microprocessor based gaming machines themselves can include various hardware and software components to provide a wide variety of game types and game playing capabilities, with such hardware and software components being generally well known in the art. A typical electronic gaming machine will have a central processing unit ("CPU") or master gaming controller ("MGC") that controls various combinations of hardware and software devices and components that encourage game play, allow a player to play a game on the gaming machine and control payouts and other awards. Software components can include, for example, boot and initialization routines, various game play programs and subroutines, credit and payout routines, image and audio generation programs, various component modules and a random number generator, among others. Hardware devices and peripherals can include, for example, bill validators, coin acceptors, card readers, keypads, buttons, levers, touch screens, coin hoppers, player tracking units and the like. In addition, each gaming machine can have various audio and visual display components that can include, for example, speakers, display panels, belly and top glasses, exterior cabinet artwork, lights, and top box dioramas, as well as any number of video displays of various types to show game play and other assorted information, with such video display types including, for example, a cathode ray tube ("CRT"), a liquid crystal display ("LCD"), a light emitting diode ("LED"), a flat panel display and a plasma display, among others.

In addition, electronic gaming machines and gaming systems often employ cashless instruments for ease of paying out winnings and/or machine credits or balances to users. Such cashless instruments can include, for example, credit cards, charge cards, stored value cards, smart cards, thermally rewritable cards or tickets, chips, tokens and other physical markers, as well as cash vouchers or paper tickets, such as those used in the EZ Pay® system by IGT of Reno, Nev. In the case of printed tickets, this can involve the use of ticket printers and other associated hardware and software components within or about the gaming machine as well. Such paper tickets are typically printed at the gaming machine by a printer upon the request of a player at the completion of a game or gaming session, and signify a cash amount owed to the player, a portion of which can include winnings owed to the player. These paper tickets typically include appropriate currency amounts and identification features, and can also include other informational items as desired by a given gaming operator.

Of course, the introduction of cashless instruments such as these paper tickets or cash vouchers can introduce new issues for players and gaming operators, such as mechanical problems with a printer or other equipment, paper or ink shortages at one or more printers or gaming machines, and new alternatives for fraud, among others. One issue that has arisen through the use of gaming machines adapted to issue such paper tickets concerns the need to reconfigure and recertify any gaming machine that is distributed to and used in a foreign jurisdictions or other locality where some other currency denomination is used. Currently, electronic gaming machines are certified by a competent authority or other authorized party when they are first manufactured. Such certification procedures and processes are well known in the art, and are required by virtually any gaming jurisdiction or authority.

Whenever a gaming machine is sent abroad and is to be reconfigured to make printed ticket payouts in a currency denomination and/or language that is different from its original manufactured currency denomination and/or language, then new programs, updates, firmware and/or other items are typically provided to the MGC, the printer, and/or various other components of the affected gaming machine. As is known in the art, however, any code change that affects primary programs run by the MGC of a gaming machine is virtually always treated as a potentially "untrustworthy" event, and thus results in a need for a recertification of the affected gaming machine. Such a recertification process can be an inconvenient, costly and time-consuming endeavor. Where payouts in different currencies and/or languages than the manufactured currency and/or language are desired, such a process is simply accepted as necessary, and the needed program and firmware updates are installed.

Whether a gaming machine remains in its originally manufactured state or is reconfigured to a new currency and/or language, virtually all gaming machines that are adapted to issue printed tickets can only do so in one currency and one language in a given configuration. Although this might not be a problem in many cases, there may arise times when such inflexibility can be inconvenient. For example, several European casinos are located in close proximity to several different countries or jurisdictions where different currencies and languages are used. In such instances, it might be more convenient to permit a player to request a printed ticket in the currency and language of his or her choice, particularly where multiple currencies are accepted and paid out by cashiers at a given casino or gaming establishment. Unfortunately, gaming machines are presently not adapted to provide such options to players.

While existing systems and methods for providing printed tickets and other cashless instruments associated with gaming machines and gaming systems have been adequate in the past, improvements are usually welcomed and encouraged. In light of the foregoing, it is desirable to develop methods and systems that can issue printed tickets and cashless instruments in multiple currencies and languages, and in particular for such methods and systems to allow individual gaming machines to issue printed tickets and cashless instruments in multiple currencies and languages without requiring a recertification of the machine when switching from one to another.

SUMMARY

It is an advantage of the present invention to provide improved systems and methods for issuing cashless instruments at a gaming machine or system. This is accomplished in many embodiments by providing within or about a gaming machine or system at least one printer with a separate printer "interpreter" (i.e., controller) that is adapted to facilitate the printing of specific credit amounts to cashless instruments in multiple different currencies, and preferably multiple different languages as well. Such results can be accomplished at least in part by separating the printer controller or interpreter and its operations from the MGC of the gaming machine, storing data regarding a number of different currencies at the printer controller or an associated location, and configuring the printer controller to convert credit amounts received from the MGC to one of the number of different currencies for which data is stored.

According to several embodiments of the present invention, the disclosed systems and methods involve a gaming machine and/or gaming system adapted for accepting a wager, playing a game based on the wager and granting a payout based on the result of the game. The gaming machine or system can include an MGC adapted to control one or more game aspects, a printer configured to print monetary amounts to cashless instruments, and a printer interpreter or controller adapted to communicate with and operate in conjunction with both the MGC and the printer. In addition to controlling various game aspects, the MGC can also be in communication with and control one or more aspects of various other gaming machine or system components. Further, the printer interpreter can be configured to receive a credit amount from the MGC, to convert the credit amount to a currency amount in units different from the units of the credit amount, and to instruct the printer to print the currency amount to a cashless instrument, such as a printed ticket, electronic storage card, thermally rewritable card or device, or any other suitable item. While the printer controller or interpreter communicates with the MGC, this printer interpreter or controller is preferably isolated from the execution of the game as it is processed by the MGC.

In embodiments including an actual gaming machine, an exterior housing arranged to contain a plurality of internal gaming machine components can also be included. Embodiments of a gaming machine and/or a gaming system can also include a plurality of input and output devices adapted to facilitate the acceptance of the wager, display of the game and granting of the monetary payout. Embodiments having a gaming system can also include a server in communication with the MGC and configured to record information regarding issued cashless instruments, as well as a database in communication with the server and adapted to store data for previously issued cashless instruments. A cashier station in communication with this server and adapted to authorize the cashing out of a valid received cashless instrument can also be included in embodiments to a gaming system.

According to other embodiments of the present invention, only a cashless instrument issuing apparatus for a gaming machine and/or a computer readable memory adapted to direct a gaming machine or system to function in a specified manner are provided, rather than an entire gaming machine or system. Embodiments involving a cashless instrument issuing apparatus can include a printer and printer controller that are substantially similar to those of the foregoing embodiments to gaming machines and systems. Embodiments involving a computer readable memory include various modules, such as one adapted to receive a communication of a specific credit amount from an MGC, another adapted to convert the specific credit amount to a currency amount in units different from the units of the specific credit amount, yet another adapted to initiate the printing of the currency amount to a cashless instrument, and still another adapted to communicate to the MGC an indication that the cashless instrument has been printed. An additional module can be included to receive an instruction signal including an identifier of one of a plurality of currencies where the converting module is further adapted to convert the specific credit amount to the currency amount indicated by the instruction signal.

According to still other embodiments of the present invention, various methods for printing cashless instruments for a gaming machine or system, or for otherwise issuing a monetary amount at a gaming machine or system are provided. Various steps can include receiving at a printer controller a communication of a specific credit amount from an MGC, converting at the printer controller that specific credit amount to a currency amount in units different from the units of the specific credit amount, and printing at a printer controlled by the printer controller that currency amount to a cashless instrument. A further step can involve sending a confirmation communication from the printer controller back to the MGC that the cashless instrument has been printed. Additional steps can further include providing a gaming machine or system having various components, including a separate printer controller isolated from the execution of a game, receiving a request or instruction to cash out a specific credit amount that is all or part of a total credit amount balance stored at the gaming machine or gaming system, and/or forwarding to a system server information regarding the specific credit amount, currency amount, or both.

Various detailed versions of any of the foregoing embodiments can include a printer controller or interpreter that is reconfigurable, such that it can be reconfigured to convert a specific credit amount to a second currency amount in units different from the original currency amount. In fact, a plurality of different currency amounts may be available for reconfiguration of the printer controller or interpreter, with each having units that are different from the others. A receiver can be included and placed in communication with this reconfigurable printer controller, with the receiver configured to receive an instruction signal from a remote source. The printer interpreter or controller, whether reconfigurable or not, can also be configured to instruct the printer to print to the cashless instruments textual information in a language corresponding to the currency units that are printed to the cashless instruments, where appropriate.

The reconfigurable printer controller can also be configured to convert a credit amount to a particular one of the plurality of different currency amounts according to the received instruction signal. This instruction signal can be initiated by: 1) a user of the gaming machine or system, such as by a manual selection of a specific currency unit; 2) by the MGC, such as by an automated determination based on one or more items received or determined by the MGC; or 3) by a server, such as by an automated determination based on one or more items received or determined by the server. Items received or determined by an MGC or server in order to make the automated determination can include a current time, a current date, a current location of the gaming machine or system and/or a language selected by a user, among others.

Other methods, features and advantages of the invention will be or will become apparent to one with skill in the art upon examination of the following figures and detailed description. It is intended that all such additional methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and process steps for the disclosed inventive systems and methods for providing advanced printed ticket generation capabilities within a gaming machine or gaming system. These drawings in no way limit any changes in form and detail that may be made to the invention by one skilled in the art without departing from the spirit and scope of the invention.

DETAILED DESCRIPTION

Figure 1:
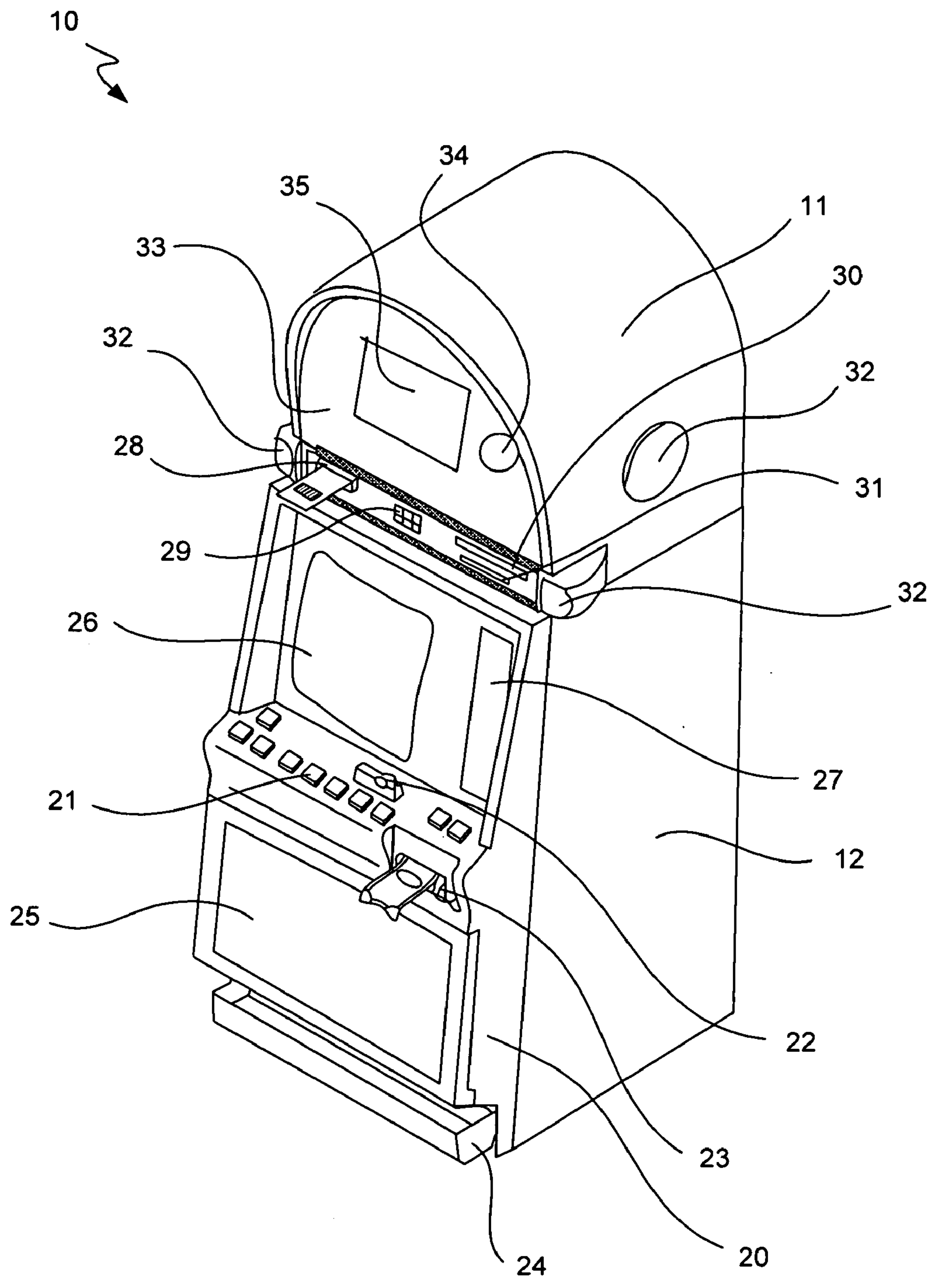
FIG. 1 illustrates in perspective view an exemplary gaming machine.

Exemplary applications of systems and methods according to the present invention are described in this section. These examples are being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following example should not be taken as definitive or limiting either in scope or setting. In the detailed description that follows, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting, such that other embodiments may be used and changes may be made without departing from the spirit and scope of the invention.

One advantage of the present invention is the introduction of methods and systems that enable the issuance of printed tickets and other suitable cashless instruments in multiple currencies and languages from the same printer or issuing device at a given gaming machine or within a gaming system. This is accomplished in part by the introduction of a specialized printer controller or "interpreter" that is adapted to accept a communication of a specific credit amount from an MGC, convert that credit amount to a specific currency amount in a particular form of currency, and instruct an associated printer to print that currency amount to a cashless instrument. Where the printer controller is reconfigurable, as is preferable, then multiple different forms of currency can be issued to cashless instruments with the same printer controller and associated printer on the fly. This is particularly useful where gaming machines are shipped to different regions where forms of currency different from those designated by the gaming machine manufacturer are used.

Another advantage of the various apparatuses, systems and methods disclosed herein is the ability to allow individual gaming machines to issue printed tickets and other suitable cashless instruments in multiple currencies and languages without requiring a recertification of the machine when switching from one to another. This can be accomplished in part by isolating the printer controller or interpreter from the game processing and other pertinent critical functions of the MGC, such that there is no concern from regulators or other governing bodies regarding reconfigurations or changes in the printer interpreter that would affect game play or any other critical function that would require a machine recertification. Although this ability is also useful with respect to gaming machines that are shipped to different regions where different forms of currency are used, it is particularly advantageous it situations where it might be desirable to permit a gaming operator, player or other user select from a plurality of currencies.

Although the present invention is directed primarily to gaming machines and systems, it is worth noting that some of the apparatuses, systems and methods disclosed herein might be adaptable for use in other types of devices, systems or environments, as applicable, such that their use is not restricted exclusively to gaming machines and contexts. Such other adaptations may become readily apparent upon review of the inventive apparatuses, systems and methods illustrated and discussed herein. For example, a printer interpreter could be used with a gaming device other than a traditional gaming machine, such as a lottery machine. The remainder of the description that follows first provides general discussions of gaming machines and then of exemplary gaming network and system configurations. Next, an exemplary specific cashless gaming system configuration is given, after which examples of printed tickets and other suitable cashless instruments are provided. Finally, details of printer interpreters are provided, after which exemplary methods of printing or otherwise issuing cashless instruments at a gaming machine or system are given.

Gaming Machines

Referring first to FIG. 1, an exemplary gaming machine is illustrated in perspective view. Gaming machine 10 includes a top box 11 and a main cabinet 12, which generally surrounds the machine interior (not shown) and is viewable by users. This top box and/or main cabinet can together or separately form an exterior housing adapted to contain a plurality of internal gaming machine components therein. Main cabinet 12 includes a main door 20 on the front of the gaming machine, which preferably opens to provide access to the gaming machine interior. Attached to the main door are typically one or more player-input switches or buttons 21, one or more money or credit acceptors, such as a coin acceptor 22 and a bill or ticket validator 23, a coin tray 24, and a belly glass 25. Viewable through main door 20 is a primary video display monitor 26 and one or more information panels 27. The primary video display monitor 26 will typically be a cathode ray tube, high resolution flat-panel LCD, plasma/LED display or other conventional or other type of appropriate video monitor. Alternatively, a plurality of gaming reels can be used as a primary gaming machine display in place of display monitor 26, with such gaming reels preferably being electronically controlled, as will be readily appreciated by one skilled in the art.

Top box 11, which typically rests atop of the main cabinet 12, may contain a ticket printer 28, a key pad 29, one or more additional displays 30, a card reader 31, one or more speakers 32, a top glass 33, one or more cameras 34, and a secondary video display monitor 35, which can similarly be a cathode ray tube, a high resolution flat-panel LCD, a plasma/LED display or any other conventional or other type of appropriate video monitor. Alternatively, secondary display monitor 35 might also be foregone in place of other displays, such as gaming reels or physical dioramas that might include other moving components, such as, for example, one or more movable dice, a spinning wheel or a rotating display, among others. It will be understood that many makes, models, types and varieties of gaming machines exist, that not every such gaming machine will include each of the foregoing items, and that many gaming machines will include other items not shown. Such gaming machines are made by many manufacturers, such as, for example, IGT.

With respect to electronic gaming machines in particular, the electronic gaming machines made by IGT are provided with special features and additional circuitry that differentiate them from general-purpose computers, such as a laptop or desktop personal computer ("PC"). Because gaming machines are highly regulated to ensure fairness, and in many cases are operable to dispense monetary awards of millions of dollars, hardware and software architectures that differ significantly from those of general-purpose computers may be implemented into a typical electronic gaming machine in order to satisfy security concerns and the many strict regulatory requirements that apply to a gaming environment. A general description of many such specializations in electronic gaming machines relative to general-purpose computing machines and specific examples of the additional or different components and features found in such electronic gaming machines will now be provided.

At first glance, one might think that adapting PC technologies to the gaming industry would be a simple proposition, since both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

Accordingly, one difference between gaming machines and common PC based computers or systems is that gaming machines are designed to be state-based systems. In a state-based system, the system stores and maintains its current state in a non-volatile memory, such that in the event of a power failure or other malfunction the gaming machine will return to its current state when the power is restored. For instance, if a player were shown an award for a game of chance and the power failed before the award was provided, the gaming machine, upon the restoration of power, would return to the state where the award was indicated. As anyone who has used a PC knows, PCs are not state machines, and a majority of data is usually lost when a malfunction occurs. This basic requirement affects the software and hardware design of a gaming machine in many ways.

A second important difference between gaming machines and common PC based computer systems is that for regulation purposes, the software on the gaming machine used to generate the game of chance and operate the gaming machine must be designed as static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulator in a particular jurisdiction and installed in the presence of a person representing the gaming jurisdiction. Any change to any part of the software required to generate the game of chance, such as, for example, adding a new device driver used by the master gaming controller to operate a device during generation of the game of chance, can require a new EPROM to be burnt, approved by the gaming jurisdiction, and reinstalled on the gaming machine in the presence of a gaming regulator. Regardless of whether the EPROM solution is used, to gain approval in most gaming jurisdictions, a gaming machine must demonstrate sufficient safeguards that prevent an operator of the gaming machine from manipulating hardware and software in a manner that gives the operator an unfair or even illegal advantage over a player. The code validation requirements in the gaming industry affect both hardware and software designs on gaming machines.

A third important difference between gaming machines and common PC based computer systems is that the number and kinds of peripheral devices used on a gaming machine are not as great as on PC based computer systems. Traditionally in the gaming industry, gaming machines have been relatively simple in the sense that the number of peripheral devices and the number of functions on the gaming machine have been limited. Further, the functionality of a gaming machine tends to remain relatively constant once the gaming machine is deployed, in that new peripheral devices and new gaming software is infrequently added to an existing operational gaming machine. This differs from a PC, where users tend to buy new and different combinations of devices and software from different manufacturers, and then connect or install these new items to a PC to suit their individual needs. Therefore, the types of devices connected to a PC may vary greatly from user to user depending on their individual requirements, and may also vary significantly over time for a given PC.

Although the variety of devices available for a PC may be greater than on a gaming machine, gaming machines still have unique device requirements that differ from a PC, such as device security requirements not usually addressed by PCs. For instance, monetary devices such as coin dispensers, bill validators, ticket printers and computing devices that are used to govern the input and output of cash to a gaming machine have security requirements that are not typically addressed in PCs. Many PC techniques and methods developed to facilitate device connectivity and device compatibility do not address the emphasis placed on security in the gaming industry. To address some of these issues, a number of hardware/software components and architectures are utilized in gaming machines that are not typically found in general-purpose computing devices, such as PCs. These hardware/software components and architectures include, but are not limited to, items such as watchdog timers, voltage monitoring systems, state-based software architectures and supporting hardware, specialized communication interfaces, security monitoring, and trusted memory.

A watchdog timer is normally used in IGT gaming machines to provide a software failure detection mechanism. In a normal operating system, the operating software periodically accesses control registers in a watchdog timer subsystem to "re-trigger" the watchdog. Should the operating software not access the control registers within a preset timeframe, the watchdog timer will time out and generate a system reset. Typical watchdog timer circuits contain a loadable timeout counter register to allow the operating software to set the timeout interval within a certain time range. A differentiating feature of some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. IGT gaming machines, however, typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT gaming machine game software is to use a state machine. Each function of the game (e.g., bet, play, result) is defined as a state. When a game moves from one state to another, critical data regarding the game software is stored in a custom non-volatile memory subsystem. In addition, game history information regarding previous games played, amounts wagered, and so forth also should be stored in a non-volatile memory device. This feature allows the game to recover operation to the current state of play in the event of a malfunction, loss of power, or the like. This is critical to ensure that correct wagers and credits are preserved. Typically, battery backed RAM devices are used to preserve this critical data. These memory devices are not used in typical general-purpose computers. Further, IGT gaming computers normally contain additional interfaces, including serial interfaces, to connect to specific subsystems internal and external to the gaming machine. The serial devices may have electrical interface requirements that differ from the "standard" EIA RS232 serial interfaces provided by general-purpose computers. These interfaces may include EIA RS485, EIA RS422, Fiber Optic Serial, optically coupled serial interfaces, current loop style serial interfaces, and the like. In addition, to conserve serial interfaces internally in the gaming machine, serial devices may be connected in a shared, daisy-chain fashion where multiple peripheral devices are connected to a single serial channel.

IGT gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this. In addition, security monitoring circuits detect intrusion into an IGT gaming machine by monitoring security switches attached to access doors in the gaming machine cabinet. Preferably, access violations result in suspension of game play and can trigger additional security operations to preserve the current state of game play. These circuits also function when power is off by use of a battery backup. In power-off operation, these circuits continue to monitor the access doors of the gaming machine. When power is restored, the gaming machine can determine whether any security violations occurred while power was off, such as by software for reading status registers. This can trigger event log entries and further data authentication operations by the gaming machine software.

Trusted memory devices are preferably included in an IGT gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the gaming machine. The code and data stored in these devices may include, for example, authentication algorithms, random number generators, authentication keys, operating system kernels, and so forth. The purpose of these trusted memory devices is to provide gaming regulatory authorities a root trusted authority within the computing environment of the gaming machine that can be tracked and verified as original. This may be accomplished via removal of the trusted memory device from the gaming machine computer and verification of the secure memory device contents is a separate third party verification device. Once the trusted memory device is verified as authentic, and based on the approval of verification algorithms contained in the trusted device, the gaming machine is allowed to verify the authenticity of additional code and data that may be located in the gaming computer assembly, such as code and data stored on hard disk drives.

Mass storage devices used in a general-purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present. In addition to the basic gaming abilities provided, these and other features and functions serve to differentiate gaming machines into a special class of computing devices separate and distinct from general-purpose computers.

With respect to the basic gaming abilities provided, it will be readily understood that gaming machine 10 can be adapted for presenting and playing any of a number of gaming events, particularly games of chance involving a player wager and potential monetary or other payout, such as, for example, a wager on a sporting event or general play as a slot machine game, a keno game, a video poker game, a video blackjack game, and/or any other video table game, among others. While gaming machine 10 can typically be adapted for live game play with a physically present player, it is also contemplated that such a gaming machine may also be adapted for game play with a player at a remote gaming terminal. Other features, functions and devices may also be used in association with gaming machine 10, and it is contemplated that the present invention can be used in conjunction with a gaming machine or device that might encompass any or all such additional types of features, functions and devices. One item that is specifically contemplated for use with the present invention involves a gaming machine that incorporates a cashless instrument feature, such as a ticket printer and/or ticket acceptor for distributing and/or accepting printed tickets of a cashless system, such as the EZ Pay® system by IGT.

General Network And System Configurations

Figure 2:
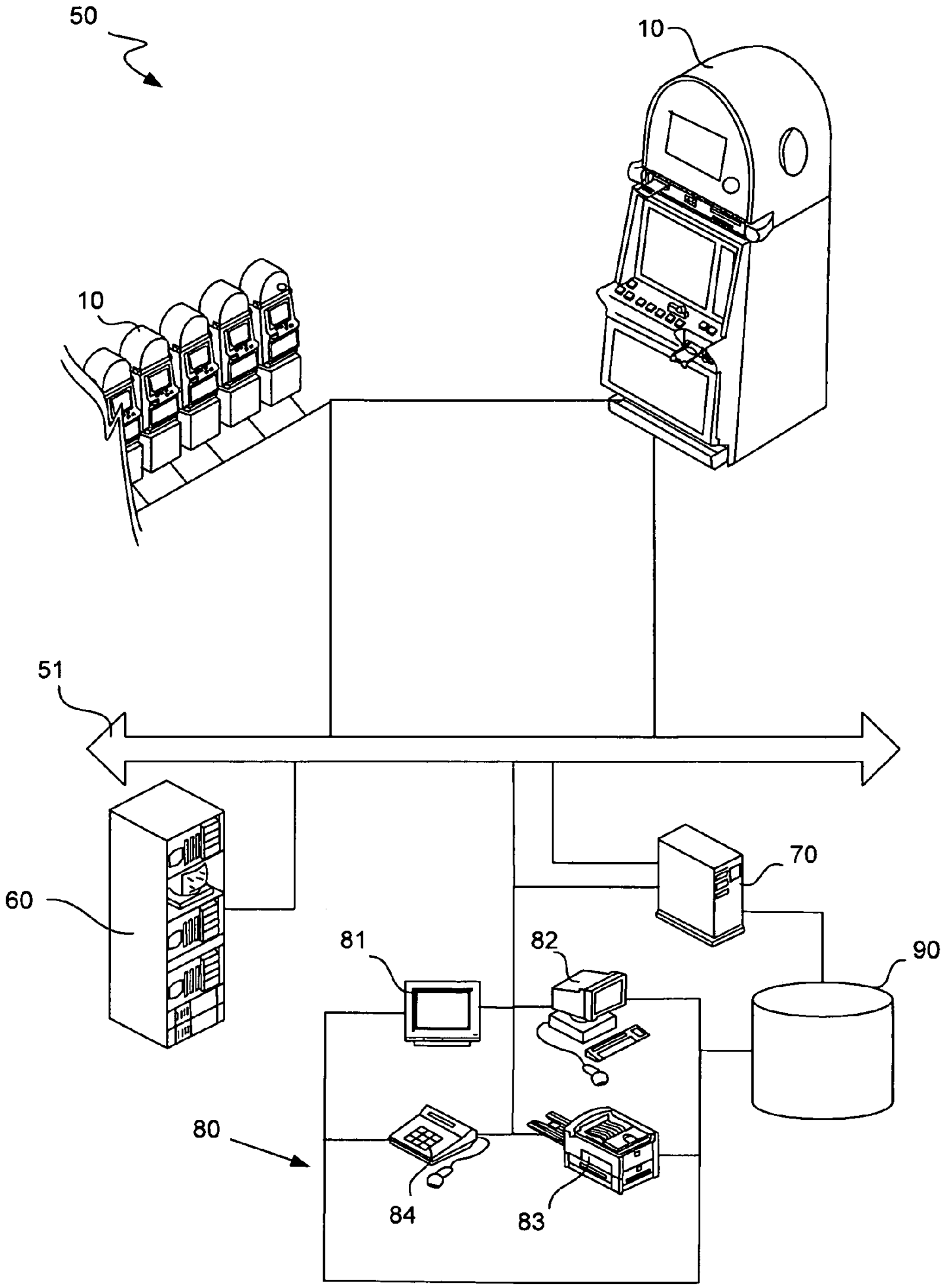
FIG. 2 illustrates in block diagram format an exemplary network infrastructure for providing a gaming system having one or more gaming machines.

Turning now to FIG. 2, an exemplary network infrastructure for providing a gaming system having one or more gaming machines is illustrated in block diagram format. Exemplary gaming system 50 has one or more gaming machines, various communication items, and a number of host-side components and devices adapted for use within a gaming environment. As shown, one or more gaming machines 10 adapted for use in gaming system 50 can be in a plurality of locations, such as in banks on a casino floor or standing alone at a smaller non-gaming establishment, as desired. Common bus 51 can connect one or more gaming machines or devices to a number of networked devices on the gaming system 50, such as, for example, a general-purpose server 60, one or more special-purpose servers 70, a sub-network of peripheral devices 80, and/or a database 90.

A general-purpose server 70 may be one that is already present within a casino or other establishment for one or more other purposes beyond any cashless instrument issuance and/or redemption involving gaming machines. Functions for such a general-purpose server can include other general and game specific accounting functions, payroll functions, general Internet and e-mail capabilities, switchboard communications, and reservations and other hotel and restaurant operations, as well as other assorted general establishment record keeping and operations. In some cases, specific gaming related functions such as cashless gaming, downloadable gaming, player tracking, remote game administration, video or other data transmission, or other types of functions may also be associated with or performed by such a general-purpose server. For example, such a server may contain various programs related to player tracking operations, specific player account administration, remote game play administration, remote game player verification, downloadable gaming, and/or visual image or video data storage, transfer and distribution, and may also be linked to one or more gaming machines, in some cases forming a network that includes all or many of the gaming devices and/or machines within the establishment. Communications can then be exchanged from each adapted gaming machine to one or more related programs or modules on the general-purpose server.

In one embodiment, gaming system 50 contains one or more special-purpose servers that can be used for various functions relating to the provision of cashless gaming and gaming machine administration and operation under the present methods and systems. Such a special-purpose server or servers could include, for example, a cashless gaming server, a player verification server, a general game server, a downloadable games server, a specialized accounting server, and/or a visual image or video distribution server, among others. Of course, these functions may all be combined onto a single server, such as specialized server 70. Such additional special-purpose servers are desirable for a variety of reasons, such as, for example, to lessen the burden on an existing general-purpose server or to isolate or wall off some or all gaming machine administration and operations data and functions from the general-purpose server and thereby increase security and limit the possible modes of access to such operations and information.

Alternatively, exemplary gaming system 50 can be isolated from any other network at the establishment, such that a general-purpose server 60 is essentially impractical and unnecessary. Under either embodiment of an isolated or shared network, one or more of the special-purpose servers are preferably connected to sub-network 80, which might be, for example, a cashier station or terminal. Peripheral devices in this sub-network may include, for example, one or more video displays 81, one or more user terminals 82, one or more printers 83, and one or more other input devices 84, such as a card reader or other security identifier, among others. Similarly, under either embodiment of an isolated or shared network, at least the specialized server 70 or another similar component within a general-purpose server 60 also preferably includes a connection to a database or other suitable storage medium 90. Database 90 is preferably adapted to store many or all files containing pertinent data or information regarding cashless instruments such as, for example, printed tickets, among other potential items. Files, data and other information on database 90 can be stored for backup purposes, and are preferably accessible at one or more system locations, such as at a general-purpose server 60, a special purpose server 70 and/or a cashier station or other sub-network location 80, as desired.

While gaming system 50 can be a system that is specially designed and created new for use in a casino or gaming establishment, it is also possible that many items in this system can be taken or adopted from an existing gaming system. For example, gaming system 50 could represent an existing cashless gaming system to which one or more of the inventive components or program modules are added. In addition to new hardware, new functionality via new software, modules, updates or otherwise can be provided to an existing database 90, specialized server 70 and/or general-purpose server 60, as desired. In this manner, the methods and systems of the present invention may be practiced at reduced costs by gaming operators that already have existing gaming systems, such as an existing EZ Pay® or other cashless gaming system, by simply modifying the existing system. Other modifications to an existing system may also be necessary, as might be readily appreciated.

Specific Cashless Gaming System Configuration

Figure 3:
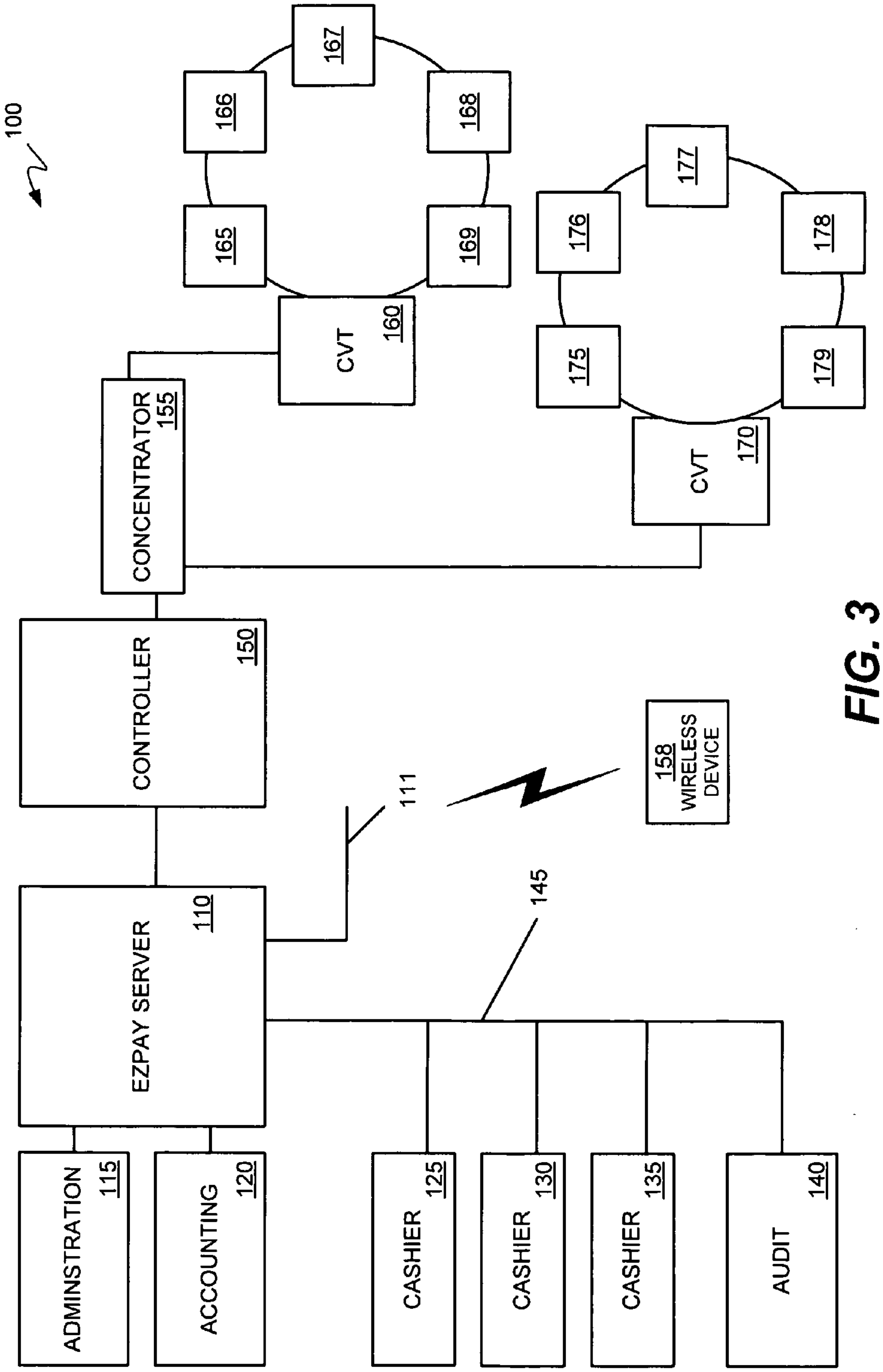
FIG. 3 illustrates in block diagram format various components of a cashless gaming system using the EZ Pay® printed ticket system.

Continuing on to FIG. 3, a block diagram of the components of a cashless system using the EZ Pay® printed ticket system according to one embodiment of the present invention is illustrated. Cashless gaming system 100 includes various hardware components and software components needed to generate and validate cashless instruments. Components of this cashless system can include, for example, 1) data acquisition hardware, 2) data storage hardware, 3) cashless instrument generation and validation hardware (e.g., printers, card readers, ticket acceptors, validation terminals, etc.), 3) auditing software, 4) cashless instrument validation software and 5) database software. Many types of cashless systems are possible and are not limited to the components listed above, or embodiments such as the EZ Pay® printed ticket system. Although the cashless instruments used in such a system can be referred to as printed tickets, ticket vouchers, cash vouchers, tickets, vouchers, and other various names, as well as credit cards, charge cards, stored value cards, smart cards, electronic storage cards, thermally rewritable cards or tickets, chips, tokens and any other suitable physical devices markers to which an amount could be printed, as appropriate, the terms "printed ticket" and "ticket" will be used herein, and will be understood to encompass all such variations, possibilities and terminologies.

A first group of gaming machines, 165, 166, 167, 168 and 169, is shown as being connected to a first clerk validation terminal ("CVT") 160, while a second group of gaming machines, 175, 176, 177, 178 and 179, is shown as being connected to a second CVT 170. Other groups of gaming machines and CVTs may also be present within this cashless gaming system 100, as will be readily appreciated. Many or all of such gaming machines can be adapted to issue printed tickets that can be exchanged for cash or accepted as credit of indicia in other gaming machine located within the cashless system 100. In this example, the printed ticket serves as a cashless instrument. In addition, one or more of these gaming machines may be adapted to accept printed tickets as well, which can be those issued within cashless gaming system 100, and possibly those issued at a different system or separate gaming property. Such a different system or gaming property may or may not utilize the same cashless system as that of cashless system 100.

Where the CVTs are not connected to one another in some way, a printed ticket issued from one gaming machine may typically be only be used as indicia of credit in another gaming machine that is in a group of gaming machines connected to the same CVT. For example, if CVT 160 and CVT 170 were completely independent and unconnected to each other in any way, a printed ticket issued from gaming machine 165 might be used as an indicia of credit in any of gaming machines 166, 167, 168 or 169, each of which are connected to common CVT 160, but not in any of gaming machines 175, 176, 177, 178, or 179, which are each connected to the other CVT 170. In an analogous manner, when the cashless systems from one casino or gaming property are not connected together in any way, then a printed ticket generated from gaming machine 166 might be not be usable at a property different from any properties that are within cashless system 100. Of course, where CVTs are connected either directly or as part of a larger system, as is shown here, then printed tickets from one set of gaming machines under one CVT 160 might be redeemable at another set of gaming machine under the other connected CVT 170, and vice-versa.

CVTs 160 and 170 are typically adapted to store cashless instrument transaction information corresponding to outstanding cashless instruments that are waiting for redemption, including printed tickets, smart cards and debit cards, among others. In this embodiment, the CVTs are separate from the gaming machines. However, the cashless instrument information may be also be stored within each gaming machine. Alternatively, one gaming machine may functionally act as a CVT for a group of gaming machines, thus eliminating a need for separate CVT hardware. In addition, cashless instrument transaction information may be stored at a cashless server, such as EZ Pay® server 110. Such a server can be identical or substantially similar to a portion of general-purpose server 60 or a special-purpose server 70 of the foregoing exemplary network configuration, for example. The cashless instrument transaction information may be used when the tickets are validated and cashed out or redeemed in some other manner. The CVTs 160 and 170 may store the information for the printed tickets issued by the gaming machines connected to the CVT. For example, CVT 160 can be adapted to store printed ticket information for printed tickets issued by gaming machines 165, 166, 167, 168, and 169. When a ticket is printed out, ticket information is sent to the CVT using a communication protocol of some type from the gaming machine. For example, a gaming machine may send transaction information to a CVT that is part of a cashless system using the slot acquisition system ("SAS") made by IGT, or the slot data system ("SDS") made by Bally Gaming Systems (Alliance Gaming Corporation of Las Vegas, Nev.).

In this embodiment, when a player wishes to cash out a printed ticket, the player may redeem tickets printed from a particular gaming machine at the CVT associated with the gaming machine, or at any other CVT that is part of the cashless system associated with the first CVT. For example, since CVT 160 and CVT 170 are connected as part of a single cashless system to the EZ Pay® server 110, a player or other user may redeem or utilize printed tickets at the gaming machines, the CVTs 160 or 170, the cashiers 125, 130 or 135, or the wireless cashier or cashiers 158. These CVTs, cashiers, wireless cashiers and gaming machines may be referred to as "cashless validation sites." To cash out the printed ticket, the ticket is validated by comparing information obtained from the printed ticket with information stored within the CVT. After a printed ticket has been cashed out, the CVT marks that ticket as being paid in a database to prevent a printed ticket with similar information from being cashed multiple times.

Not all cashless systems may utilize CVTs, and many of the functions of a CVT may be transferred to a cashless server, such as the EZ Pay® server 110, thus eliminating the need for a CVT or various functions within an existing CVT. For instance, the cashless instrument transaction information may be stored in the cashless server instead of the CVT. Thus, the need to store cashless instrument transaction information within the CVT may be eliminated. In this embodiment using the EZ Pay® system, multiple groups of gaming machines connected to CVTs are connected together in a cross validation network 145. The cross validation network is typically comprised of one or more concentrators 155 that accept inputs from two or more CVTs and enable communications to and from the two or more CVTs using one communication line. Each concentrator can be connected to a front-end controller 150 that may poll the CVTs for printed ticket information. This front-end controller is connected to an EZ Pay® server 110, which may in turn provide various information services to other system components, which can include accounting 120 and administration 115 computers, modules, locations or units, among others.

One hardware and software platform allowing cashless instruments to be utilized at all of the cashless validation sites (e.g., cashier stations, gaming machines, wireless cashiers and CVTs) within a single property and across multiple properties can be referred to as a "cashless server." In this embodiment, an EZ Pay® server 110 may function as the cashless server. Usually, this cashless server is a communication nexus in the cross validation network 145. For instance, the EZ Pay® server 110 can be connected to the cashiers, wireless devices, remote cashless instrument transaction clearinghouse, CVTs and the gaming machines via the CVTs, among other items.

The cross validation network 145 allows printed tickets generated by any gaming machine connected to the cross validation network to be accepted by other gaming machines in the cross validation network. Additionally, the cross validation network allows a cashier at a cashier station 125, 130, or 135 to validate any printed ticket generated from a gaming machine within the cross validation network 145. To cash out a printed ticket, a player may present the printed ticket at one of the cashier stations 125, 130, and 135, or to a game service representative carrying a wireless gaming device 158 for validating printed tickets. Further details of such a wireless gaming device 158, including hardware and utilization, are described in commonly owned U.S. Pat. No. 6,682,421, issued to Rowe, and entitled "WIRELESS GAME ENVIRONMENT," which is incorporated herein by reference in its entirety and for all purposes. Information obtained from the printed ticket is used to validate the ticket by comparing information on the ticket with information stored on one of the CVTs connected to the cross validation network 145. In addition, when the printed ticket was issued at another property, the information on the ticket may be stored at the other property. Thus, to validate the printed ticket, the EZ Pay® server may have to communicate with the cashless instrument transaction clearinghouse via a remote connection 111 or other similar means to obtain the information necessary to validate the printed ticket.

As printed tickets are issued and/or validated, this information can be sent to an audit services computer or unit 140 providing audit services, an accounting computer or unit 120 providing accounting services, and/or an administration computer or unit 115 providing administration services. In another embodiment, all of these services may be provided by a cashless server, such as EZ Pay® server 110. Examples of auditing services, which may be provided by cashless system software residing on an auditing computer 140, include 1) session reconciliation reports, 2) soft count reports, 3) soft count verification reports, 4) soft count exception reports, 5) machine ticket status reports and 6) security access reports, among others. Examples of accounting services, which may be provided by cashless system software residing on an accounting computer 120, include 1) ticket issuance reports, 2) ticket liability reports, 3) expired ticket reports, 4) expired ticket paid reports and 5) ticket redemption reports, among others. Examples of administration services, which may be provided by cashless system software residing on an administration computer 115 include 1) manual ticket receipts, 2) manual ticket reports, 3) ticket validation reports, 4) interim validation reports, 5) validation window closer reports, 6) voided ticket receipts and 7) voided ticket reports, among others.

Cashless Instruments

As noted above, any cashless instruments suitable for use with a printer or other similar writing device can be used in the systems and methods disclosed herein, and such items can include, for example, tickets, vouchers, printed tickets, ticket vouchers, cash vouchers, credit cards, charge cards, stored value cards, smart cards, electronic storage cards, thermally rewritable cards or tickets, chips, or tokens, among others. Similarly, while use of a printer is specifically contemplated for use with the present invention and is accordingly illustrated herein, other suitable devices similarly adapted to write or transfer amounts to cashless instruments may be used in place of a printer where appropriate, as will be readily appreciated. Examples of such devices could be thermal or electronic ink rewrite devices, among others. As is known in the art, such cashless instruments can be used in place of cash or coins in order to transfer credit and/or cash to a player or other user, as well as to transfer credit and/or cash from a player to a gaming machine or other gaming device adapted to accept cashless instruments. For example, a printed ticket or other suitable cashless instrument having a particular cash value printed or otherwise stored thereon can be issued by a gaming machine to a player or user, can be accepted by a gaming machine from a player or user, can be purchased by a player or user with cash, credit or some other suitable transfer of funds, can be exchanged by a player or user for cash, credit or some other suitable transfer of funds, or can be used for other purposes, as is known.

Figure 4A:
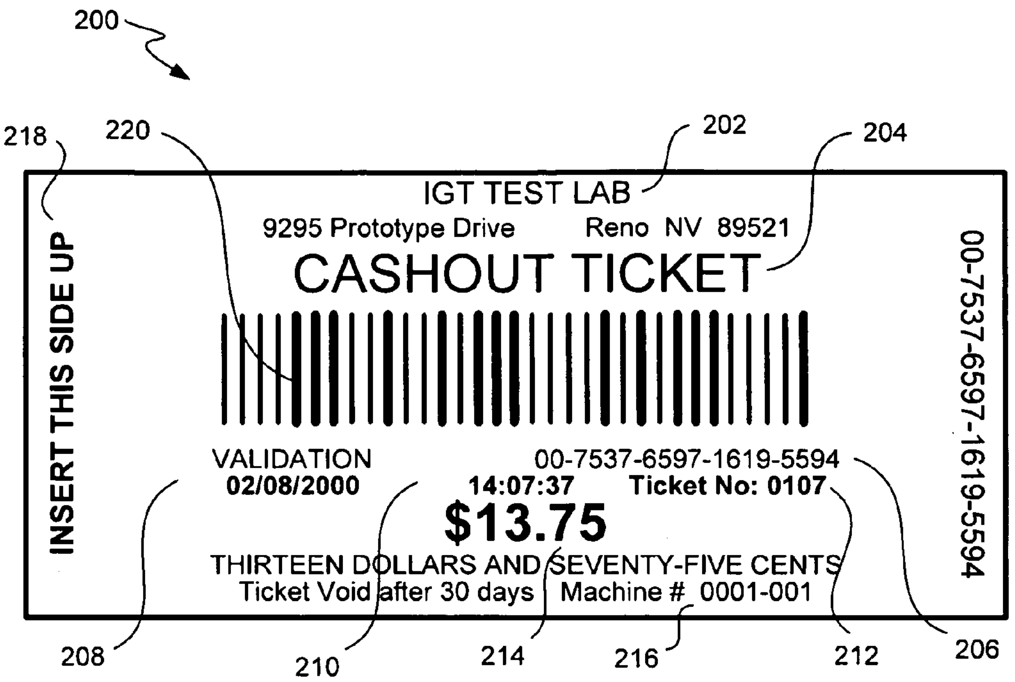
FIGS. 4A-4D illustrate in top plan view several exemplary printed tickets.

Turning now to FIG. 4A, an exemplary printed ticket, such as that which is used in an EZ Pay® printed ticket system, is illustrated in top plan view. Printed ticket 200 is a form of cashless instrument that is particularly popular in many forms of gaming machines and gaming systems, and is preferably formed of paper or some other similarly suitable material. Cashless instruments such as printed ticket 200 typically include a number of informational elements, such as, for example, a casino or operator identifier 202, a ticket identifier 204, a validation number 206, a date 208, a time 210, a ticket number 212, a particular cash value with an appropriate currency symbol 214, and a gaming machine identification number 216, among others. Printed ticket 200 may also display other helpful information, such as instructions 218 on the front and/or back of the ticket. Printed ticket 200 might also includes a bar code 220 or other similar item that stores one or more of the above informational elements in a manner that is readable by machines, such as gaming machines, cashier machines, or other network devices. For example, bar code 220 may include validation number 206 in bar form. Of course, each of these items may or may not be present on any given printed ticket or cashless instrument, and other items not shown may also be stored on or printed to ticket 200, including, but not limited to, a cluster controller address, a ticket status, a status change time, an expiration date, standard warranties, advertisements, promotional information and/or other related items, as desired.

Figure 4B:
Figure 4C:
Figure 4D:

Moving next to FIGS. 4B-4D, several more exemplary printed tickets are shown in top plan view as well. In particular, printed ticket 230 of FIG. 4B is printed at least partially in Spanish and issued in pesos, printed ticket 232 of FIG. 4C is printed at least partially in Cyrillic and issued in rubles, and printed ticket 234 of FIG. 4D is printed in English and issued in pounds. It will be understood that these various printed tickets are merely exemplary in nature, and that other formats, language combinations or uniformly translated tickets may be used, as desired. As will be readily appreciated, a wide variety of other languages and denominations may also be used. In fact, it is specifically contemplated that any language and/or any currency may be used in combination on any printed ticket or other cashless instrument in accordance with the present invention. Specific implementations of other printed tickets and translations to different languages and/or currencies on printed tickets are provided in greater detail below.

Figure 4E:
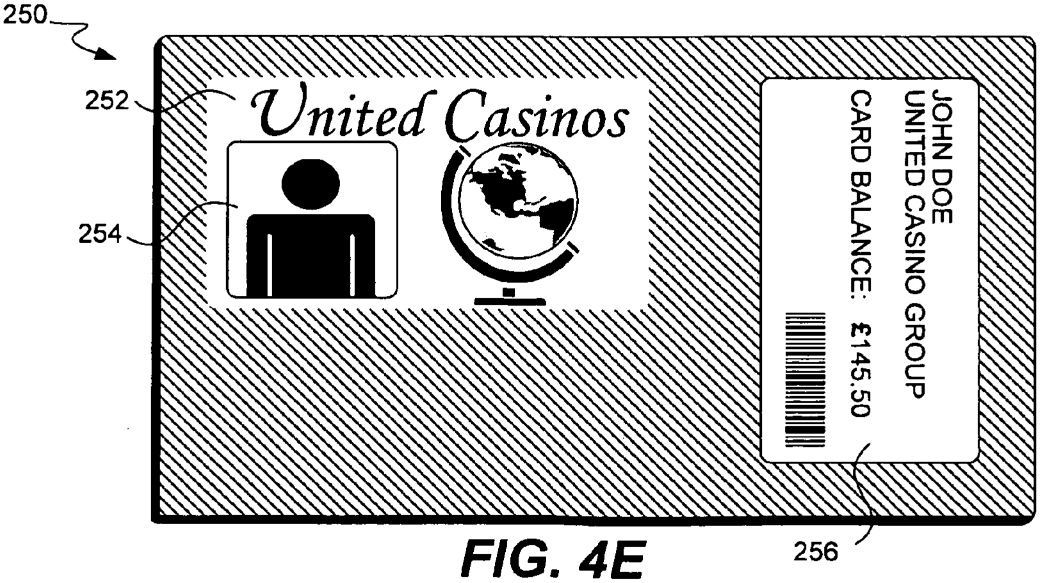
FIG. 4E illustrates in top plan view an exemplary alternative cashless instrument in the form of a storage card with a rewritable display.

Continuing on to FIG. 4E, an exemplary alternative cashless instrument in the form of a card with a rewritable display is illustrated in top plan view. While the printed ticket 200 of FIG. 4A is typically an item to which information such as a cash amount is printed with ink or another similar printing medium, storage card 250 of FIG. 4E is a cashless instrument that generally utilizes other means for holding cash amounts for a player or other user. In the particular example given, storage card 250 contains a label or other identification region 252, which may contain a picture or other personal identifier 254 for a particular user, as desired. In addition, a rewritable display 256 is adapted to show a current cash amount stored on the card, among other pertinent items of information. Again, a bar code may be used to render the card as machine-readable. Rewritable display 256 can be in numerous forms, such as, for example, a thermal imprint or rewrite region, or an electronic ink region, among others. A particular advantage of using a storage card 250 or a similarly sophisticated cashless instrument is the ability to reuse the item, such that costs for resources such as paper and ink can be saved in the long run.

In any event, printed ticket 200 and storage card 250 are both simply examples of the many different forms of cashless instruments that can be used in conjunction with the present invention. Other forms of cashless instruments can be used as well, and it will be understood that the actual devices that are used to print or otherwise write cash or credit amounts to such other cashless instruments can be considered as "printers," any and all of which can also include an inventive printer interpreter or controller, as well as any associated methods, as detailed below.

Printer Interpreters and Controllers

Figure 5A:
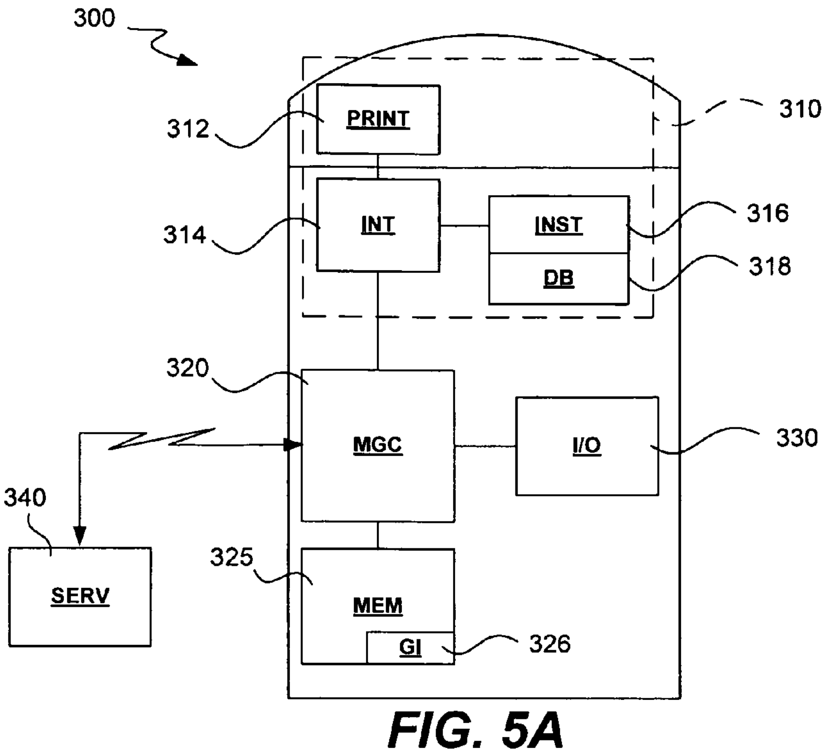
FIG. 5A illustrates in block diagram format an exemplary architecture for a gaming machine having a specialized printer interpreter and a printer adapted to print to cashless instruments according to one embodiment of the present invention.

FIG. 5A illustrates in block diagram format an exemplary architecture for a gaming machine having a specialized printer interpreter and a printer adapted to print to cashless instruments according to one embodiment of the present invention. Again, it will be understood that these items can represent devices of any suitable form that are adapted to print to or otherwise designate cash or credit amounts to cashless instruments. In addition, it will be understood that the terms "interpreter," "printer interpreter," "controller" and "printer controller" as used herein all refer to the same item, that being a specialized controller adapted for specific use with a printer or similar designating device used in a gaming machine or gaming system. Specialized gaming machine 300 contains a specialized printing unit 310 having various components, an MGC or other similar primary processor 320 having one or more associated memory units 325, which preferably include at least a portion of specific game instructions 326, and a variety of input and output devices 330. This gaming machine 300 is preferably associated with a gaming system or network having at least one server 340, which can be in a remote location, and which is preferably in communication with the MGC 320 of the gaming machine. As set forth in greater detail above, this gaming network, system and/or server can be of any form, may have various associated databases and other components, and can be used for other purposes in addition to administering cashless instrument systems.

While shown as being located partially within the top box of gaming machine 300, it will be readily understood that the various components of specialized printing unit 310 can be located entirely within a top box, entirely within a main cabinet, within both a top box and main cabinet combined, or partially within the gaming machine and partially about the exterior of the gaming machine, as desired. In fact, it is even possible for one or more components to be located remotely from the gaming machine in some instances. Printing unit 310 can include a printer 312 or other actual hardware device adapted to print or otherwise transfer information or data to printed tickets or other suitable cashless instruments, as well as a specialized printer interpreter or controller 314 having one or more associated memory units with a set of instructions 316 and an associated database 318. In a preferred embodiment, the printer interpreter 314 is in direct communication with and interposed between the MGC 320 and the actual printer 312 or other hardware device. In this regard, the MGC sends instructions regarding the issuance of a printed ticket or other printing to a cashless instrument, but these instructions are received and acted on by the printer interpreter, which is the controller having direct control over the actual printer.

Instructions 316 preferably include cash out instructions or procedures for the interpreter 314 when handling high-level communications from the MGC 320 regarding issuing printed tickets, and database 318 preferably includes information for the interpreter regarding a variety of different currencies and languages. Such high level communications from the MGC can be, for example, an instruction to issue a printed ticket and a communication of a specific credit amount, whereupon the printer interpreter converts the specific credit amount to a currency amount in units different than that of the credit amount, and then gives specific instructions to the printer as to how to print a ticket bearing that currency amount. In one example, the specific credit amount could be 1375 units, with the corresponding currency amount being $13.75. In this same situation, alternative currency amounts could be, for example, £7.88 or ¥1547, among others.

It is preferable that instructions 316 and database 318 be isolated from the MGC 320, and as such be within the operating province of the printer interpreter 314. Also, it is particularly noteworthy that game instructions 326, and indeed any and all operations associated with the play of any actual game, should be isolated from the printer interpreter 314, such that the printer interpreter cannot affect the execution or outcome of a game in any way. In this regard, any replacement or reconfiguring of a printer interpreter 312, an entire printing unit 310, or any portion thereof would not affect crucial game play code, protocols or procedures in any way. Because any changes to such crucial game play code, protocols or procedures typically results in a need to recertify the affected gaming machine, replacements or reconfigurations such as the foregoing that do not make such changes would not typically then result in a need for the gaming machine to be recertified in most gaming jurisdictions.

For purposes of discussion, it will be assumed that printer interpreter 314 of gaming machine 300 is relatively static and thus cannot be reset or reconfigured for a different currency or language. In such cases, any change that might be desired to a different currency and/or language could then involve replacing the interpreter 314, entire print unit 310 and/or any portion thereof with a interpreter, unit and/or other components adapted and configured to issue printed tickets in the desired currency and/or language. While such swapping or replacement of items may be somewhat inconvenient, the comparative inconvenience of also needing to recertify the entire gaming machine is typically obviated where the present print unit architecture is used. It should also be noted that although the present discussion assumes that the printer interpreter 314 is not reconfigurable, it is specifically contemplated that this printer interpreter could be reconfigurable in some instances. Various details provided below for reconfigurable interpreters would then apply in such cases, as appropriate.

As a particular example of an application involving a printer interpreter that is not reconfigurable, gaming machine 300 is manufactured with U.S. dollars as the unit of currency and English as the language on its printed tickets. The gaming machine is then shipped to the United Kingdom, where the printer interpreter 314 configured for U.S. dollars is removed and a replacement interpreter configured for British pounds is installed. While the gaming machine might then still display, accept wagers and grant awards in U.S. dollar amounts, printed tickets are issued in British pounds. Of course, the gaming machine could be reconfigured to display amounts in British pounds, although such an adjustment would then likely result in a need for a full recertification of the machine. Alternatively, the gaming machine could be originally manufactured to display, accept wagers and grant awards in any generic form of credit units, whereby appropriate exterior labeling and conversions within the printer interpreter would account for the proper local currency. However, in instances where a gaming machine displays and plays in one form of currency, this currency can then be considered the base "credit amount" where a printer interpreter converts it to another form of currency in different units for purposes of printing a ticket.

Gaming machine 300 is later shipped to Japan, where the British pound interpreter is then replaced with another interpreter configured for Japanese yen and Japanese as its language. Replacement of the printer 312 for a printer adapted to print in Japanese may also be necessary in such an instance. In this regard, the interpreter can be specifically adapted to translate certain items from the original language of the gaming machine to the specific language being printed to the issued tickets or other cashless instruments. Again, no reconfiguration of the rest of the gaming machine would be necessary, and actual game play in the original format, language, and credit or currency could then continue. As in the above instance, the replacement of the printer interpreter facilitates the cash out process such that printed tickets or other cashless instruments are issued in an appropriate local currency and language. Of course, other currencies and languages may also be used in a printer interpreter and overall print unit, and the foregoing specific examples are not intended to be limiting in any way. In addition, various mounts, harnesses, connectors, and "plug-and-play" items and devices may preferably be designed into gaming machine 300 to facilitate the ready removal and reinstallation of a printer interpreter and/or various other printer unit components, including the entire printer unit, as desired.

Figure 5B:
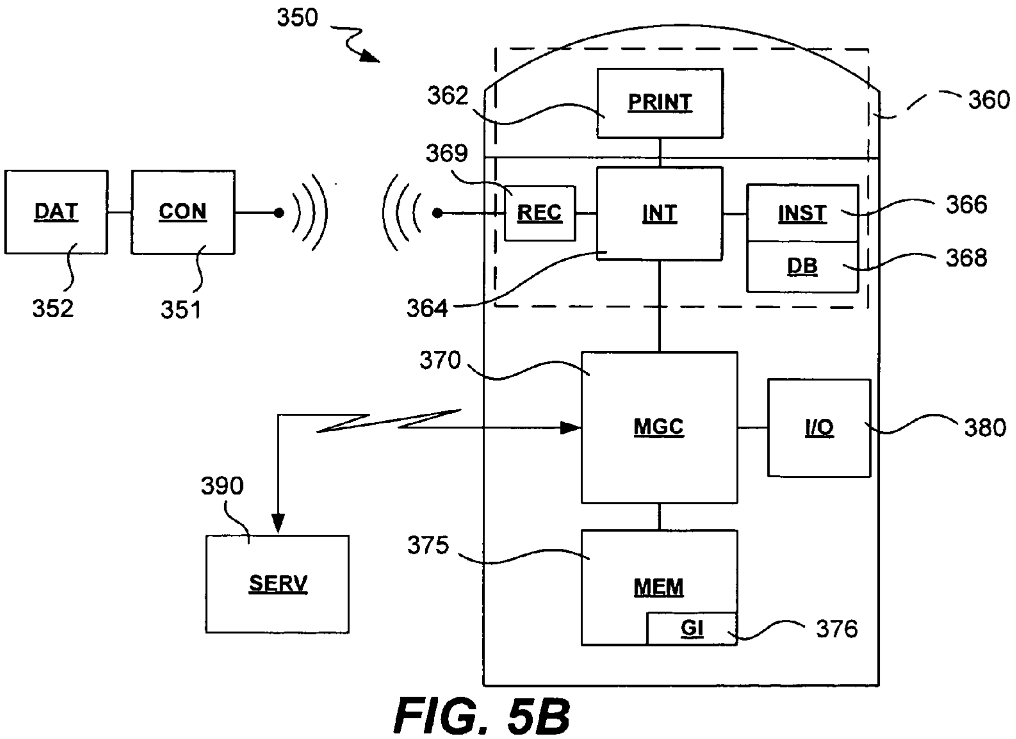
FIG. 5B illustrates in block diagram format an exemplary architecture for a gaming machine having a reconfigurable printer interpreter and a printer adapted to print to cashless instruments according to one embodiment of the present invention.

Moving next to FIG. 5B, an exemplary architecture for a gaming machine having a reconfigurable printer interpreter and a printer adapted to print to cashless instruments according to one embodiment of the present invention is also illustrated in block diagram format. Again, such a reconfigurable interpreter could be used in the case of the previous gaming machine 300, as discussion of the more preferred reconfigurable interpreter is more appropriate here where a receiver and other items for use with a reconfigurable interpreter are discussed. Similar to the above example, specialized gaming machine 350 contains a specialized printing unit 360 having various components, an MGC or other similar primary processor 370 having one or more associated memory units 375, which preferably include at least a portion of specific game instructions 376, and a variety of input and output devices 380. A remote server 390 and/or other system or network items may also be associated with gaming machine 350. Also similar to the foregoing embodiment, printing unit 360 can include a printer 362 and a printer interpreter 364 having one or more associated memory units with a set of instructions 366 and an associated database 368. Again, these items can be anywhere within, about or remote from the gaming machine.

Unlike the foregoing example, however, gaming machine 350 also has a receiver 369 as part of its printing unit 360, with this receiver being adapted to receive instructions or communications from a sending source and to forward such communications on to the interpreter 364. As noted above, interpreter 364 is also preferably reconfigurable, such that different currencies and/or languages can be printed to issued tickets or other cashless instruments without removing or replacing the interpreter. In such instances, the interpreter can be reconfigured such that its set currency and/or language for printed tickets is changed. Data or code regarding such a reconfiguration is preferably stored within the instructions 366 and/or currency database 368. In addition, such data and even new currencies or currency updates can be transmitted to interpreter 364 via receiver 369 from a separate outside controller 351, which can have an associated database 352 or other similar storage device. Receiver 369 can be selected from any of a number of different types of receivers, such as a radio frequency device, a cellular device, an optical device and a ported or permanently hard-wired device, among others.

Given the potential for misuse or fraud in such a system involving outside information making its way to even an isolated printer controller or interpreter, use of any outside controller 351 is preferably subject to stringent encryption and security methods. Such an arrangement provides further motivation to isolate the printer interpreter from all crucial operations of the MGC, such that any successful hacking or other misuse would be limited to activities within the actual printing unit 360. In addition, the use of a server 390 within an overall gaming system to communicate with MGCs and not printer interpreters, to record transactions as reported by MGCs, and check the veracity and authenticity of all printed tickets upon tender can further hinder and discourage any undue attempts to defraud or tamper with the interpreter.

Database 368 preferably contains data on a plurality of different forms of currency, such as, for example, various dollars, various pesos, various rupees, euro, pound, yen, franc, and lira, among others. Appropriate symbols for each different form of currency or currency unit are stored in the database (e.g., $, £, ¥, €, etc.) as well as exchange rates and/or other factors for use by the interpreter in converting a given amount from one set of units to the units of a particular form of currency. Appropriate languages that correspond to each form of currency may also be stored. For example, a reconfiguration or setting to yen would likely be accompanied by a corresponding reconfiguration or setting to Japanese as the used language, while a similar reconfiguration or setting to U.S. dollars or British pounds would be matched with English as a language selection. Of course, such settings could be made merely as defaults, with overrides or changes being made available per a particular gaming operator or player selection, or where otherwise appropriate. In some cases, such as for a euro configuration in particular, it may be preferable to provide ways for an operator or user to select from a plurality of available appropriate languages.

Use of the outside controller 351 and receiver 369 can be quite useful where it is desirable to provide updated exchange rates, particularly in instances where gaming machine 350 is adapted to issue printed tickets in numerous different currencies at any given time. Such cases could involve situations where players or other users are permitted to select a desired currency from a menu of available currencies upon requesting that a printed ticket or other cashless instrument be issued or updated. In such instances, current exchange rates could be provided on a weekly, daily, or even hourly basis, as desired. Of course, such provided exchange rates do not necessarily need to reflect a true exchange rate, as a margin, convenience factor, or some other component can be included in the provided rate, as will be generally appreciated. Where the outside controller provides such updated exchange rates or other data to the interpreter, such data is preferably stored within at least a portion of the database for future use, possibly until the next update is provided. Such updates may optionally be provided with expiration dates, in the event that instruments in a particular currency should not be issued unless an exchange rate update in that currency has been provided within a specified period of time, such as a day or a week. In such cases, the interpreter may be programmed to decline issuance in a particular currency until an update is provided or the issue is otherwise resolved. Alternatively, updates and other downloads to the interpreter can be provided from a network host or other source through the gaming machine itself, such as through the MGC.

Use of a reconfigurable interpreter 364 provides numerous advantages, including the ability to permit reconfiguration from a number of different sources or "modes" of selection. As one mode of selection, a remote system or host, such as outside controller 351, can provide a specific instruction signal to the interpreter as to the appropriate currency and language to use. This mode is particularly useful where there is really only one correct selection, and the casino or other gaming operator can make the appropriate selection and render it as semi-permanent for a given gaming machine installation. While relatively simple, such a mode would be advantageous in the U.S. to United Kingdom to Japan example above, in that the configuration would merely be changed and not the entire interpreter upon each new relocation. As another mode of selection, the player or user can be allowed to select manually from a variety of available currencies and/or languages. Various devices and techniques known in the art for allowing player or user input can allow the user to pick a desired currency and/or language, with the selection then resulting in an instruction signal to printer interpreter or controller as to which currency and/or language should be used.

As yet a third mode of selection for a reconfigurable printer controller or interpreter, the configuration of currency and/or language used can be automatically determined by the MGC, the interpreter, or a combination of both. Such an automatic selection can be based on a number of factors, including, for example, the current time, current date, current location of the gaming machine and/or a language selected by a player or user of the gaming machine, among others. For example, in a gaming machine adapted to present games or other information in a variety of languages, a player choice to play the game in Italian might result in an automatic determination of the MGC and/or printer interpreter to issue any resulting printed ticket in Italian and in lira. Such an automated determination might be particularly useful in situations where it is expected that players of many nationalities might visit an establishment to play gaming machines, and where a comprehensive ticketing system is implemented in a number of countries and jurisdictions. In such instances, it may be desirable for an Italian player playing a gaming machine in France to receive a printed ticket in Italian and for lira, either to cash out the ticket in lira immediately where received, or to bring it home to cash out in Italy at some future time. Of course, other examples involving other languages, locations and factors can also be used for an automated determination of the currency and language to use on a given printed ticket.

One other item of note is that that format of information on a printed ticket or other cashless instrument is frequently dependent upon the jurisdiction where that ticket or instrument is issued. Regulators from various locations tend to require different things on these items, many times in different formats. Frequently, there will be various fields on a printed ticket that are highly regulated, such as for a currency amount, verification number, and bar code, among others. In a preferred embodiment, data regarding meeting the regulations of many different jurisdictions can be included in the instructions and/or database associated with the interpreter. In addition, it may also be possible to update this data as regulations change, such as through the use of an outside controller 351 and receiver 369. Where such items are not included in a given printing unit, such as in gaming machine 300, it would be preferable that any newly installed printing unit 310, interpreter 314, instructions 316 and/or database 318 account for such changes.

Once the jurisdictional requirements for the various regulated fields of issued printed tickets are accounted for, the printing unit and/or printer interpreter can be adapted to include other information in the non-regulated fields of any issued ticket, as desired. For example, promotional materials or advertisements may be printed to one or more non-regulated regions of a ticket, with instructions for doing so being programmed into the interpreter, associated interpreter instructions, and/or associated interpreter database, as needed. In such instances, one set of firmware adapted to control that which is printed to all regulated fields can be provided, and this set of firmware is preferably not changed, with the possible exception being when updates to the various regulations are provided. Additional sets of firmware adapted to control that which is printed to the non-regulated fields can then be provided, and it is these added sets of firmware that can be optionally altered by a given gaming operator or other gaming machine owner, as desired. Of course, providing a plurality of firmware sets to account for each separate specific jurisdiction where the gaming machine could be used would likely be necessary.

Methods of Use

In general, the foregoing devices and systems can be utilized to benefit both gaming operators and players in creating and using specialized gaming machines and devices that are adapted to issue cashless instruments in multiple forms of currency. As detailed above, this can be accomplished through use of a specialized printer interpreter or controller that is adapted to convert specific credit or currency amounts to currency amounts of a different form or in different units, and then to instruct an associated printer to print these currency amounts to cashless instruments.

Figure 6:
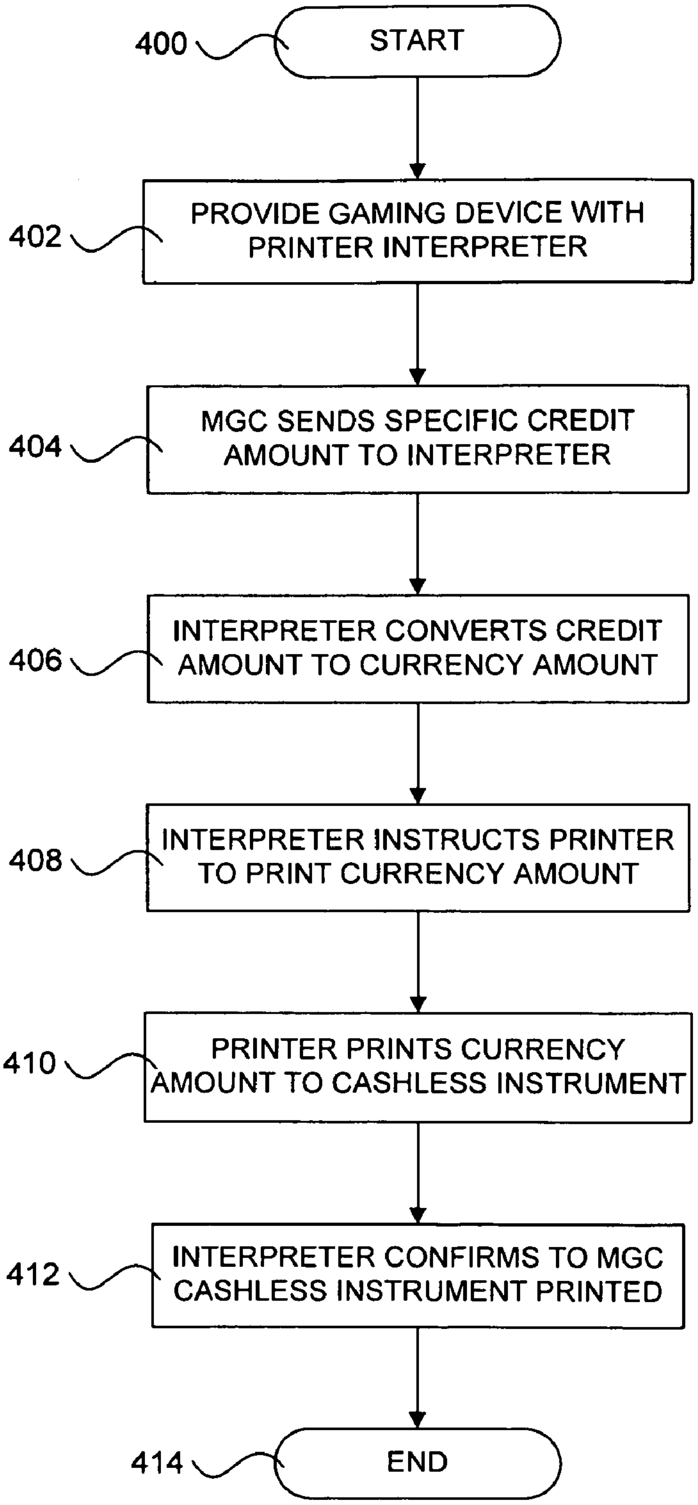
FIG. 6 provides a flowchart of one exemplary method of issuing cashless instruments according to one embodiment of the present invention.

Turning now to FIG. 6, a flowchart conveying one method of issuing cashless instruments according to an embodiment of the present invention is shown. While the provided flowchart may be comprehensive in some respects, it will be readily understood that not every step provided is necessary, that other steps can be included, and that the order of steps might be rearranged as desired by a given gaming operator, gaming machine manufacturer, retrofitter or repairperson. After start step 400, a gaming machine or other relevant gaming device is provided at a process step 402. While such a device can be a gaming machine with an associated printer interpreter, as discussed above, it will also be understood that this gaming device could also be a gaming device similarly associated with a printer interpreter and that is used at a table game, sports book, keno lounge, or other gaming location.

At process step 404, the MGC of the gaming machine or other similar gaming device sends a specific credit amount to the associated printer interpreter, after which the interpreter converts the credit amount to a currency amount at process step 406. As noted above, the converted currency amount is in units that are different from the specific credit amount that was sent. Such a conversion could be from a form of generic points or credits to a particular currency (e.g., credits to dollars), or alternatively could be from one particular form of currency to another having different units (e.g., dollars to yen). At a subsequent process step 408, the interpreter instructs the printer to print the currency amount to a printed ticket or other cashless instrument, after which the printer does print the currency amount as instructed at process step 410. Finally, the interpreter confirms to the MGC that the ticket or other suitable cashless instrument has been printed, at which point the method ends at end step 414. Of course, various other steps not included may also take place, such as, for example, the MGC then removing an account balance for the player in response to receiving confirmation that an appropriate ticket has been printed.

Figure 7:
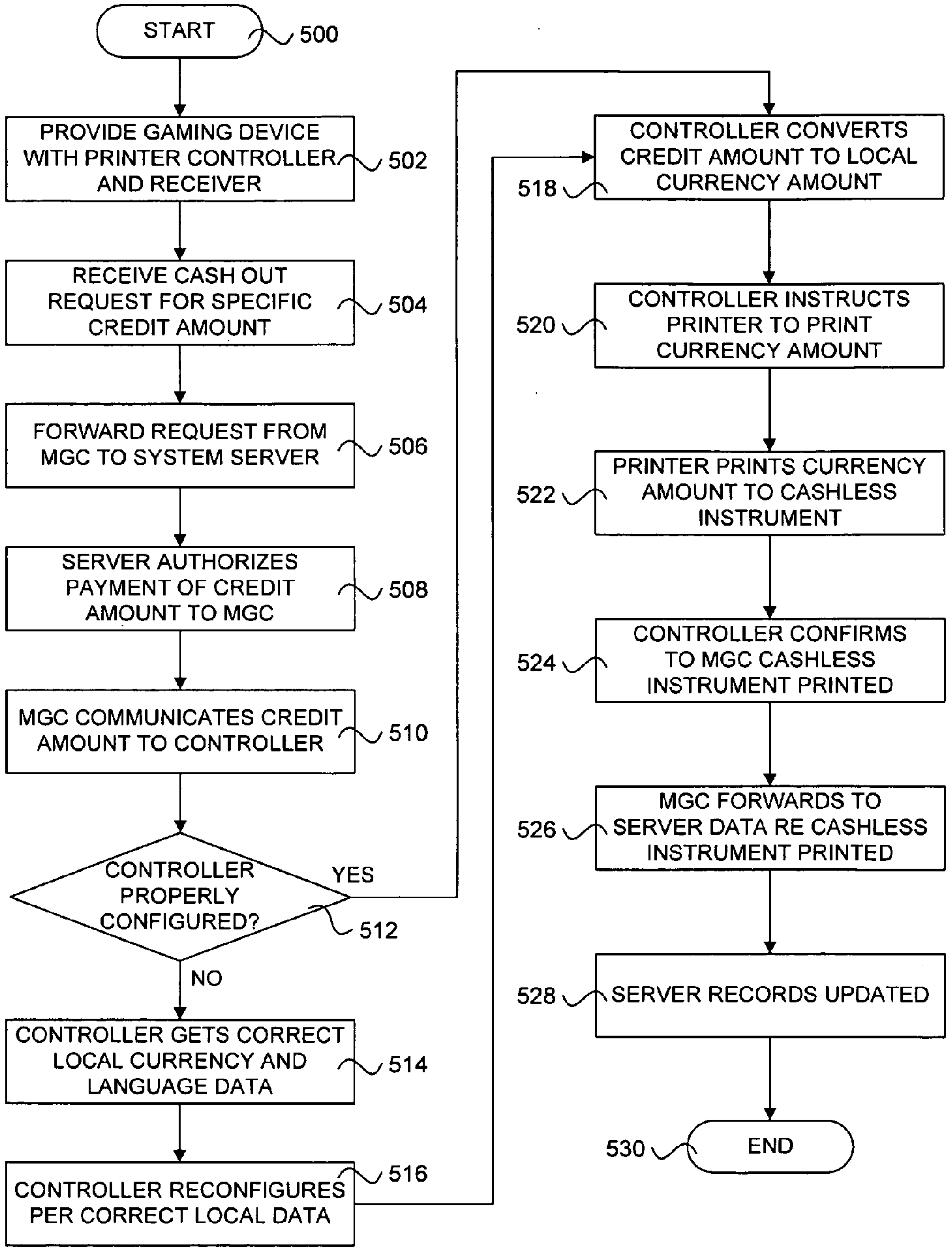
FIG. 7 provides a flowchart of another exemplary method of issuing cashless instruments according to one embodiment of the present invention.

Moving lastly to FIG. 7, a more detailed flowchart of another exemplary method of issuing cashless instruments according to one embodiment of the present invention is provided. Again, while the provided flowchart may be comprehensive in some respects, it will be readily understood that not every step provided is necessary, that other steps can be included, and that the order of steps might be rearranged as desired. After start step 500, a gaming device having a reconfigurable printer controller and receiver is provided at a process step 502. Similar to the foregoing, while such a device can be a gaming machine with an associated reconfigurable printer controller, it will also be understood that such a gaming device could also be one that is associated with a reconfigurable printer controller and that is used at a table game, sports book, keno lounge, or other gaming location.

At process step 504, a cash out request for a specific credit amount is received, typically by the MGC or some other similar processor at the gaming device. While the cash out request may be for the entire amount credited or due to the player or user making the request, it is also possible for the amount to be some portion of the entire amount or balance due. At a following process step 506, the cash out request is forwarded from the MGC of the relevant gaming device to a system server, where the request can be checked for security and system bookkeeping purposes, among other reasons. The system server then authorizes payment of the credit amount to the MGC at process step 508, after which the MGC communicates the specific credit amount to the printer controller at process step 510. At a following decision step 512, an inquiry is made as to whether the printer controller is properly configured. If so, the method continues to process step 518, but if not, then steps 514 and 516 are performed before continuing. Where the controller is not properly configured for the correct currency and/or language to be printed, data for the correct local currency and/or language are retrieved by the controller at process step 514. The controller is then reconfigured with the correct local data at process step 516.

The properly configured controller then converts the transferred specific credit amount to the correct local currency amount at process step 518, which step again involves a conversion from one set of units to another set of units different from those of the specific credit amount. At process step 520, the controller then instructs the printer to print the currency amount to a ticket or other cashless instrument, after which the printer does so as instructed at process step 522. Subsequently, the printer controller confirms to the MGC that the ticket or cashless instrument was printed at process step 524, after which the MGC forwards to the server data regarding the printed ticket or other cashless instrument at process step 526. Finally, the server records are updated according to the forwarded data at process step 528, after which the method ends at end step 530. Again, various details and additional steps may similarly be included, and it is specifically contemplated that many variations of these exemplary methods may also be practiced.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A gaming machine, said gaming machine comprising:

an exterior housing arranged to contain a plurality of internal gaming machine components therein;

a master gaming controller in communication with at least one of said plurality of internal gaming machine components, said master gaming controller being adapted to execute or control one or more aspects of a game by performing game execution operations;

a printer unit comprising:

a printer configured to print to cashless instruments monetary amounts issued by said gaming machine, each cashless instrument comprising at least one regulated field and one non-regulated field; and a printer interpreter, in direct communication with and interposed between the master gaming controller and the printer, said printer interpreter being isolated from the game execution operations of the master game controller such that the printer interpreter cannot affect execution or an outcome of the game;

a first set of firmware configured to reference a jurisdictional requirement of the at least one regulated field, and to control printing of the cashless instrument within the regulated field;

a second set of firmware, separate and distinct from said first set of firmware, configured to control printing of the at least one unregulated field; wherein said printer interpreter is configured to:

receive a credit amount in a first currency unit from said master gaming controller, convert the credit amount to a player-selectable first currency amount in a first currency unit different from both the units of the credit amount and a second currency amount in a second currency unit, and under control of said first set of firmware and said second set of firmware, instruct said printer to print, to the cashless instrument, textual information and the first currency amount, said textual information being in a language corresponding to the first currency units and comprising the at least one regulated field as indicated by said first set of firmware.

2. The gaming machine of claim 1, wherein said printer interpreter comprises a reconfigurable printer controller adapted to be reconfigured to convert said credit amount to a second currency amount selected from a plurality of different currency amounts, with each of said plurality of different currency amounts being in currency units different from said credit amount, said first currency amount and from each other.

3. The gaming machine of claim 2, further comprising:

a receiver in communication with said reconfigurable printer controller and configured to receive an instruction signal from a remote source, wherein said reconfigurable printer controller is further configured to convert said credit amount to a particular one of said plurality of different currency amounts according to the instruction signal.

4. The gaming machine of claim 2, wherein said reconfigurable printer controller is configured to receive an instruction signal initiated by a user of said gaming machine and to convert said credit amount to a particular one of said plurality of different currency amounts according to the instruction signal.

5. The gaming machine of claim 2, wherein said reconfigurable printer controller is configured to receive an instruction signal initiated by said master gaming controller and to convert said credit amount to a particular one of said plurality of different currency amounts according to the instruction signal.

6. The gaming machine of claim 5, wherein said instruction signal initiated by said master gaming controller is generated based on one or more items received or determined by said master gaming controller.

7. The gaming machine of claim 6, wherein said one or more items received or determined by said master gaming controller include at least one item selected from the group consisting of a current time, a current date, a current location of said gaming machine and a language selected by a user of said gaming machine.

8. The gaming machine of claim 2, wherein said reconfigurable printer controller is further configured to instruct said printer to print textual information to said cashless instruments, and wherein said textual information is printed in a language corresponding to the currency units of said second currency amount.

9. The gaming machine of claim 1, wherein said cashless instruments include printed tickets.

10. A method comprising:

receiving a request or instruction to cash out a specific credit amount, in a first currency unit, at a gaming machine, said specific credit amount comprising all or part of a total credit amount balance stored at said gaming machine, said gaming machine comprising:

an exterior housing arranged to contain a plurality of internal gaming machine components therein, a master gaming controller in communication with at least one of said plurality of internal gaming machine components and adapted to execute or control one or more aspects of said game by performing game execution operations;

a printer unit comprising:

a printer configured to print to cashless instruments monetary amounts issued by said gaming machine, each said cashless instrument comprising at least one regulated field and one non-regulated field, and a printer interpreter, in direct communication with and interposed between the master gaming controller and the printer, said printer interpreter being isolated from the game execution operations of the master game controller such that the printer interpreter cannot affect execution or an outcome of the game;

a first set of firmware configured to reference a jurisdictional requirement of the at least one regulated field, and to control printing of the cashless instrument within the regulated field;

a second set of firmware, separate and distinct from said first set of firmware, configured to control printing of the at least one unregulated field;

communicating said specific credit amount to be cashed out from said master gaming controller to said printer interpreter;

converting the credit amount to a player-selectable first currency amount in a first currency unit different from both the units of the credit amount and a second currency amount in a second currency unit; and printing, at said printer, under control of said first set of firmware and said second set of firmware, to the cashless instrument: said first currency amount and textual information, said textual information being in a language corresponding to the first currency units and comprising the at least one regulated field as indicated by said first set of firmware.

11. The method of claim 10, wherein said cashless instruments include printed tickets.

12. The method of claim 10, further comprising:

sending confirmation from said printer interpreter to said master gaming controller that said specific credit amount has been discharged to a cashless instrument.

13. The method of claim 10, further comprising:

forwarding to a system server information regarding said specific credit amount, said first currency amount, or both.

14. The method of claim 10, wherein said printer controller comprises a reconfigurable controller adapted to be reconfigured to convert said credit amount to a second currency amount selected from a plurality of different currency amounts, with each of said plurality of different currency amounts being in currency units different from said credit amount, said first currency amount and from each other.

15. The method of claim 14, further comprising:

receiving, at a receiver configured to communicate with said reconfigurable printer controller, an instruction signal from a remote source, wherein said reconfigurable printer controller is further configured to convert said credit amount to a particular one of said plurality of different currency amounts according to the instruction signal.

16. The gaming machine of claim 1, wherein the printer interpreter is configured to act in conjunction with the master game controller to determine the jurisdictional requirement for a jurisdiction in which the gaming machine is located.

17. The gaming machine of claim 1, wherein the printer interpreter is further configured to determine from the jurisdictional requirement if the jurisdiction in which the gaming machine is located requires a required field be printed in a required area of the cashless instrument, and wherein the printer interpreter is configured to print each required field within its required area of the instrument.

* * * * *